US012036679B2

(12) United States Patent
Utsugi et al.

(10) Patent No.: US 12,036,679 B2
(45) Date of Patent: Jul. 16, 2024

(54) INFORMATION PROCESSING DEVICE AND INFORMATION PROCESSING METHOD

(71) Applicant: HITACHI, LTD., Tokyo (JP)

(72) Inventors: Kei Utsugi, Tokyo (JP); Sanato Nagata, Tokyo (JP); Koji Ara, Tokyo (JP); Hisaya Ishibashi, Tokyo (JP); Toshio Moriya, Tokyo (JP)

(73) Assignee: HITACHI, LTD., Tokyo (JP)

( * ) Notice: Subject to any disclaimer, the term of this patent is extended or adjusted under 35 U.S.C. 154(b) by 305 days.

(21) Appl. No.: 17/767,482

(22) PCT Filed: Sep. 30, 2020

(86) PCT No.: PCT/JP2020/037219
§ 371 (c)(1),
(2) Date: Apr. 8, 2022

(87) PCT Pub. No.: WO2021/070711
PCT Pub. Date: Apr. 15, 2021

(65) Prior Publication Data
US 2023/0219226 A1 Jul. 13, 2023

(30) Foreign Application Priority Data
Oct. 11, 2019 (JP) ................. 2019-187444

(51) Int. Cl.
*G06F 17/00* (2019.01)
*B25J 9/16* (2006.01)
(52) U.S. Cl.
CPC ........... *B25J 9/1671* (2013.01); *B25J 9/1653* (2013.01)
(58) Field of Classification Search
CPC ........ B25J 9/1671; B25J 9/1653; B25J 13/00; G05B 19/41885; G06F 9/50; G06F 30/27; G06Q 10/04

(Continued)

(56) References Cited

U.S. PATENT DOCUMENTS 10,853,536 B1\* 12/2020 Steingrimsson ........ G06F 30/20
2018/0059649 A1\* 3/2018 Fujii .................. G05B 19/4155
(Continued)

FOREIGN PATENT DOCUMENTS

JP 2000317779 A \* 11/2000
JP 2000317779 A 11/2000
(Continued)

OTHER PUBLICATIONS

Developing a hierarchical decomposition methodology to increase manufacturing process and equipment health awareness (Year: 2017).\*

(Continued)

*Primary Examiner* — Ronnie M Mancho
(74) *Attorney, Agent, or Firm* — MATTINGLY & MALUR, PC

(57) ABSTRACT

An indicator related to work performed through a plurality of hierarchical processes is predicted efficiently with high accuracy. The information processing device stores sample data in association with each parameter representing work, the sample data including an indicator generated by execution of lower-level simulation based on a lower-level model set for a lower-level process, and the information processing device predicts an indicator related to predicted work by performing higher-level simulation using the sample data associated with a parameter similar to a parameter representing the predicted work, the higher-level simulation being based on a higher-level model which is set for a higher-level process. If sample data associated with a parameter similar to the parameter representing the predicted work is not stored, the information processing device complements sample data by performing lower-level simulation and performs higher-level simulation using the complemented sample data.

12 Claims, 22 Drawing Sheets

(58) Field of Classification Search
USPC .......................................................... 700/245
See application file for complete search history.

(56) References Cited

U.S. PATENT DOCUMENTS

| | | | |
|---|---|---|---|
| 2018/0189431 A1* | 7/2018 | Adra | ........................ G06F 30/20 |
| 2021/0086354 A1* | 3/2021 | Berg | ......................... B25J 9/163 |
| 2023/0029445 A9* | 1/2023 | Adra | ........................ G06F 30/20 |

FOREIGN PATENT DOCUMENTS

| | | | | |
|---|---|---|---|---|
| JP | 2003108220 A | * | 4/2003 | |
| JP | 2003108220 A | | 4/2003 | |
| JP | 2012014386 A | | 1/2012 | |
| JP | 2018036945 A | | 3/2018 | |
| JP | 2018139041 A | * | 9/2018 | ....... G05B 19/41865 |
| JP | 6856135 B2 | * | 4/2021 | ....... G05B 19/41865 |
| JP | 7008917 B2 | * | 1/2022 | .............. B25J 5/007 |
| WO | WO-2021070711 A1 | * | 4/2021 | ............ B25J 9/1653 |

OTHER PUBLICATIONS

International Search Report of PCT/JP2020/037219 dated Dec. 1, 2020.

* cited by examiner

EQUIPMENT INFORMATION 114

| EQUIPMENT ID 1141 | MAXIMUM SPEED OF ARM'S VERTICAL MOVEMENT 1142 | MAXIMUM SPEED OF ARM'S HORIZONTAL MOVEMENT 1143 | RECOGNITION MODULE'S AVERAGE PERFORMANCE VALUE 1144 | HARDWARE PERFORMANCE DETERIORATION MARGIN 1145 |
|---|---|---|---|---|
| 234 | 300cm/sec | 500cm/sec | 25 ELEMENTS/sec | 79% |
| 378 | 400cm/sec | 550cm/sec | 34 ELEMENTS/sec | 91% |
| 387 | 400cm/sec | 550cm/sec | 34 ELEMENTS/sec | 95% |
| : | : | : | : | : |

FIG. 5

WORKER INFORMATION 115

| PRODUCT FEATURE VALUE 1151 | | | ENVIRONMENT FEATURE VALUE (CONVEYOR BELT LENGTH) 1152 | WORK CONTENT 1153 | PERIOD OF EXPERIENCE 1154 | TIME USED 1155 | CONSECUTIVE HOURS OF ENGAGEMENT 1156 |
|---|---|---|---|---|---|---|---|
| $Z_1$ | $Z_2$ | $Z_3$ | | | | | |
| 5 | 120 | 300 | 1200mm | OPERATING INCOMING CONVEYOR BELT | 2 YEARS & 4 MONTHS | 12 sec | 135 min |
| 6 | 100 | 200 | ⋮ | OPENING INCOMING BOXES | 2 YEARS & 4 MONTHS | 24 sec | 135 min |
| 6 | 100 | 100 | ⋮ | INSPECTION | 2 YEARS & 4 MONTHS | 48 sec | 136 min |
| 5 | 110 | 280 | ⋮ | PACKING OUTGOING BOXES | 2 YEARS & 4 MONTHS | 37 sec | 137 min |
| 5 | 120 | 150 | 800mm | OPERATING OUTGOING CONVEYOR BELT | 2 YEARS & 4 MONTHS | 15 sec | 137 min |
| ⋮ | ⋮ | ⋮ | ⋮ | ⋮ | ⋮ | ⋮ | ⋮ |

FIG. 6

PARAMETER GENERATION INFORMATION
(WHEN EQUIPMENT IS USED) 116

| PARAMETER ID (1161) | ACQUISITION SOURCE (1162) | ITEM USED (1163) | CALCULATION FORMULA (1164) |
|---|---|---|---|
| $Z_1$ | WORK INFORMATION | [NUMBER OF ITEMS OF GOODS] | $x_0$ |
| $Z_2$ | WORK INFORMATION | [WEIGHT] | $x_0$ |
| $Z_3$ | WORK INFORMATION | [MAXIMUM LENGTH] | $x_0$ |
| $Z_4$ | WORK INFORMATION | [RIGHT-SIDE-UP-WITH-CARE REQUIRED] | $x_0$ |
| $Z_5$ | EQUIPMENT INFORMATION | [MAXIMUM SPEED OF ARM'S VERTICAL MOVEMENT, HARDWARE PERFORMANCE DETERIORATION MARGIN] | $x_0 * x_1$ |
| $Z_6$ | EQUIPMENT INFORMATION | [MAXIMUM SPEED OF ARM'S HORIZONTAL MOVEMENT, HARDWARE PERFORMANCE DETERIORATION MARGIN] | $x_0 * x_1$ |

FIG. 7A

PARAMETER GENERATION INFORMATION
(WHEN WORK IS PERFORMED BY WORKER) 116

| PARAMETER ID (1161) | ACQUISITION SOURCE (1162) | ITEM USED (1163) | CALCULATION FORMULA (1164) |
|---|---|---|---|
| $Z_1$ | WORK INFORMATION | [NUMBER OF ITEMS OF GOODS] | $x_0$ |
| $Z_2$ | WORK INFORMATION | [WEIGHT] | $x_0$ |
| $Z_3$ | WORK INFORMATION | [MAXIMUM LENGTH] | $x_0$ |
| $Z_4$ | WORK INFORMATION | [RIGHT-SIDE-UP-WITH-CARE REQUIRED] | $x_0$ |
| $Z_5$ | WORKER INFORMATION | [WORKER'S PERIOD OF EXPERIENCE] | $x_0$ |
| $Z_6$ | WORKER INFORMATION | [CONSECUTIVE HOURS OF ENGAGEMENT] | $x_0$ |

FIG. 7B

PARAMETER 117

| DATA ID | PARAMETER ELEMENT | | | | | |
|---|---|---|---|---|---|---|
| | $Z_1$ | $Z_2$ | $Z_3$ | $Z_4$ | $Z_5$ | $Z_6$ |
| 1 | 15 | 139 | 21 | 0 | 251 | 438 |
| 2 | 3 | 118 | 15 | 0 | 265 | 404 |
| ⋮ | ⋮ | ⋮ | ⋮ | ⋮ | ⋮ | ⋮ |

FIG. 8A

SAMPLE DATA
(SAME FOR COMPLEMENTARY DATA 119) 118

| DATA ID | PARAMETER ELEMENT | | | | | |
|---|---|---|---|---|---|---|
| | $Z_1$ | $Z_2$ | $Z_3$ | $Z_4$ | $Z_5$ | $Z_6$ |
| 1011 | 16 | 140 | 20 | 0 | 250 | 450 |
| 1012 | 4 | 120 | 20 | 0 | 250 | 450 |
| ⋮ | ⋮ | ⋮ | ⋮ | ⋮ | ⋮ | ⋮ |

| TIME USED | RATE OF CHANGE OF EACH PARAMETER ELEMENT (CALCULATED VALUE) | | | | | |
|---|---|---|---|---|---|---|
| | $dy/dz_1$ | $dy/dz_2$ | $dy/dz_3$ | $dy/dz_4$ | $dy/dz_5$ | $dy/dz_6$ |
| 14.57 sec | 0.4 | 0.1 | 0.2 | 0.5 | 0.0003 | 0.0001 |
| 4.37 sec | 0.35 | 0.08 | 0.2 | 0.5 | 0.0003 | 0.0001 |
| ⋮ | ⋮ | ⋮ | ⋮ | ⋮ | ⋮ | ⋮ |

FIG. 8B

PROCESS WORK STACK TABLE 120

| PROCESS ID | WORK ID | PROGRESS LEVEL | TIME SPENT | VIRTUAL START TIME |
|---|---|---|---|---|
| PROCESS A | WORK 1 | 100% | 243 sec | 9:48:01 |
|  | WORK 2 | 50% | 216 sec | 9:58:12 |
| PROCESS B | : | 0% | : | : |
| : | : | : | : | : |

1201 1202 1203 1204 1205

CURRENT TIME IN SIMULATION: 10:00 AM

FIG. 9

VIRTUAL PROCESS PROGRESS TABLE 121

| WORK ID | PROCESS A1 START | PROCESS A1 END | PROCESS A2 START | PROCESS A2 END | PROCESS A3 START | PROCESS A3 END | ... |
|---|---|---|---|---|---|---|---|
| WORK 1 | 9:48:01 | 9:52:04 | 9:59:23 | Null | Null | Null | ... |
| WORK 2 | 9:58:12 | Null | Null | Null | Null | Null | ... |
| WORK 3 | Null | Null | Null | Null | Null | Null | ... |
| : | : | : | : | : | : | : | : |

1211 1212 1213 1214 1215 1216 1217

CURRENT TIME: 10:00AM

FIG. 10

| INPUT KEY | TYPE | x | y | input_string |
|---|---|---|---|---|
| setup | cmd | | | "robot_simulator init.dat" |
| set_size | click_and_string | 200 | 120 | "[0],[1],[2]" |
| set_weight | click_and_string | 200 | 160 | "[0]" |
| set_friction | click_and_string | 200 | 200 | "[0]" |
| execute | click | 200 | 300 | |
| finish_check | doubleclick_cmd | 200 | 320 | Ctrl+C |

FIG. 13A

```
#EXAMPLE OF RPA SCRIPT
#RECEIVE FOLLOWING AS ARGUMENT LIST FROM OUTSIDE
size_x, size_y, size_z,weight,friction setup() #ACTIVATE SIMULATOR
wait(4.0) #WAIT FOUR SECONDS FOR ACTIVATION
set_size(size_x,size_y,size_z) #INPUT OBJECT SIZE
set_weight(weight) #INPUT OBJECT WEIGHT
set_friction(friction) #INPUT SKIN FRICTION COEFFICIENT OF OBJECT
execute() #ACTIVATE OPERATION SIMULATION
wait(100.0) #STAND BY 100 SECONDS FOR TERMINATION
resultdat=finish_check() #MOVE MOUSE TO PREDETERMINED POSITION AND COPY TEXT return  resultdat #RETURN READ RESULTS TO SYSTEM AND USE RESULTS
```

FIG. 13B

WORK INFORMATION 113

WORK SCHEDULES

| WORK 7/1 | WORK 7/2 | WORK 7/3 | ... |
|---|---|---|---|
| TOTAL NUMBER OF ITEMS OF GOODS IN WORK 1200 | TOTAL NUMBER OF ITEMS OF GOODS IN WORK 1500 | TOTAL NUMBER OF ITEMS OF GOODS IN WORK 1250 | |
| NUMBER OF WORK TYPES 820 | NUMBER OF WORK TYPES 810 | NUMBER OF WORK TYPES 1020 | |
| TOTAL WORK WEIGHT 1850 | TOTAL WORK WEIGHT 3850 | TOTAL WORK WEIGHT 1050 | |
| EXPECTED NUMBER OF WORKERS 78 | EXPECTED NUMBER OF WORKERS 98 | EXPECTED NUMBER OF WORKERS 128 | |
| EXPECTED COMPLETION TIME 17:30 | EXPECTED COMPLETION TIME 18:30 | EXPECTED COMPLETION TIME 17:00 | |
| PREDICTED PROFIT INDICATOR: +3.4 | PREDICTED PROFIT INDICATOR: +1.4 | PREDICTED PROFIT INDICATOR: −2.4 | |

FIG. 16

| WORK DATE | PARAMETER ELEMENT | | | | |
|---|---|---|---|---|---|
| | $Z_1$ TOTAL NUMBER OF ITEMS OF GOODS IN WORK | $Z_2$ NUMBER OF WORK TYPES | $Z_3$ TOTAL WORK WEIGHT | $Z_4$ EXPECTED NUMBER OF WORKERS | $Z_5$ NUMBER OF WORK ROBOTS |
| JUL-01 | 1200 | 820 | 1850 | 78 | 24 |
| JUL-02 | 1500 | 810 | 3850 | 98 | 28 |
| JUL-03 | 1250 | 1020 | 1050 | 128 | 28 |

PARAMETER 117

1171 (WORK DATE) 1172 (PARAMETER ELEMENT)

FIG. 17

EXAMPLE OF THREE-DIMENSIONAL SIMULATION VIDEO

INFORMATION PROCESSING DEVICE AND INFORMATION PROCESSING METHOD

TECHNICAL FIELD

The present invention relates to an information processing device and an information processing method, and relates particularly to a technique for performing simulation of a process.

BACKGROUND ART

The present application is based on and claims priority from Japanese Patent Application No. 2019-187444 filed on Oct. 11, 2019, the entire disclosure of which is incorporated herein by reference.

Patent Literature 1 discloses a simulator coordinating apparatus configured with an aim to solve a problem in which simulation performed by a plurality of simulators cannot be synchronized. The simulator coordinating apparatus attempts to solve the above problem by receiving a sample interval for periodical execution of simulation from a user, acquires first execution results obtained by the first simulator for the length of the sample interval from a first simulator, acquires second execution results for the length of the sample interval from a second simulator for an apparatus to be controlled, outputting the first execution results to the second simulator, outputting the second execution results to the first simulator, and causing the first simulator and the second simulator to periodically execute simulation at the sample interval.

CITATION LIST

Patent Literature

[PTL 1] Japanese Patent Application Publication No. 2018-36945

SUMMARY OF INVENTION

Technical Problem

As a method for predicting an indicator related to work performed through a plurality of hierarchical processes, such as work efficiency, by executing simulation, there are a method with simulation using a higher-level model which is a model set for a higher-level process (hereinafter referred to as "higher-level simulation") and a method with simulation using a lower-level model which is a model set for each lower-level process forming the higher-level process (hereinafter referred to as "lower-level simulation").

With the higher-level simulation, results can be produced fast due to its relatively low processing load, but high prediction accuracy cannot be expected. The lower-level simulation, on the other hand, can offer more accurate prediction than the higher-level simulation, but has heavier processing load and requires a longer time to produce results.

PTL 1 above discloses a method for coordinating a plurality of simulators, but does not disclose anything about a mechanism for improving accuracy or for decreasing processing load in simulation of work performed through a plurality of hierarchical processes.

The present invention has been made in view of such background and has an object to provide an information processing device and an information processing method which enable highly-accurate, efficient prediction of an indicator related to work performed through a plurality of hierarchical processes.

Solution to Problem

An aspect of the present invention to achieve the above objective is an information processing device configured to predict an indicator related to work performed through a plurality of hierarchical processes, wherein regarding the work, the information processing device is configured to store sample data in association with each parameter representing the work, the sample data being data including an indicator generated by execution of lower-level simulation which is simulation based on a lower-level model which is a model set for a lower-level process which is the process at a lower level, and regarding predicted work, which is work predicted, the information processing device is configured to predict an indicator related to the predicted work by performing higher-level simulation using the sample data associated with a parameter similar to a parameter representing the predicted work, the higher-level simulation being simulation based on a higher-level model which is a model set for a higher-level process which is the process at a higher level.

Other problems and solutions thereto disclosed by the present application will be demonstrated in the section of Description of Embodiments and the drawings.

Advantageous Effects of Invention

The present invention enables highly-accurate, efficient prediction of an indicator related to work performed through a plurality of hierarchical processes.

BRIEF DESCRIPTION OF DRAWINGS

FIG. 5 is an example of equipment information.

FIG. 6 is an example of worker information.

FIG. 7 is an example of parameter generation information.

FIG. 8(a) is an example of a parameter, and FIG. 8(b) is an example of sample data.

FIG. 9 is an example of a process work stack table.

FIG. 10 is an example of a virtual process progress table.

FIG. 13(a) is an example of screen information used in execution of an RPA script, and FIG. 13(b) is an example of an RPA script for automatic execution of simulation.

FIG. 16 is an example of work information (a second embodiment).

FIG. 17 is an example of a parameter (the second embodiment).

DESCRIPTION OF EMBODIMENTS

Figure 1:
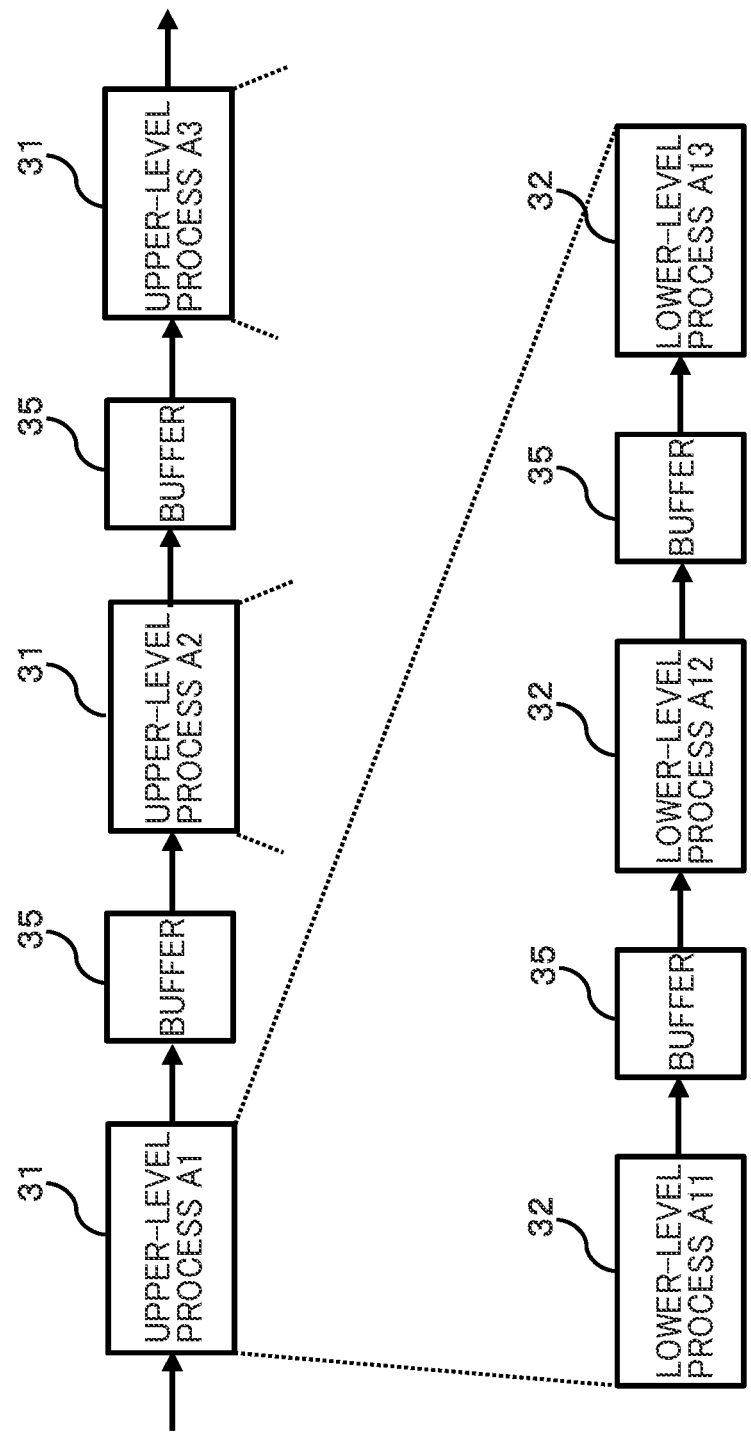
FIG. 1 is an example of work performed through a plurality of hierarchical processes.

Embodiments are described below with reference to the drawings. The following descriptions may omit repetitive descriptions by giving the same reference numeral to configurations having the same or like function. Also, in the following descriptions, the letter "S" followed by a number denotes a processing process.

First Embodiment

FIG. 1 is an example of work performed through a plurality of hierarchical processes (such as, for example, work in warehouse operation or work in product manufacturing operation). As shown in FIG. 1, the work exemplified includes higher-level processes 31 (A1, A2, A3) and lower-level processes 32 forming each higher-level process 31 (only the lower-level processes 32 (A11, A12, A13) for the higher-level process A1 are exemplified in FIG. 1). An output from each process is inputted to the following process via a buffer 35 (such as a storage area for packages or products).

For example, as a method for finding predicted values of various indicators (KPIs: Key Performance Indicators) related to the work shown in FIG. 1, such as work efficiency, work quality, and profit rate, there are a method with simulation using a higher-level model which is a model set for a higher-level process 31 (hereinafter referred to as "higher-level simulation") and a method with simulation using a lower-level model which is a model set for each lower-level process 32 forming the higher-level process 31 (hereinafter referred to as "lower-level simulation").

As an example, a case is considered here of finding a predicted value of time spent in a case where work predicted by a publicly-known workload prediction method (hereinafter referred to as "predicted work") is inputted into a higher-level process 31. In this case, higher-level simulation finds the above time used using a higher-level model for performing approximation processing such as, for example, dividing the workload of the predicted work by an average number of processing tasks or an average number of units manufactured. Meanwhile, the lower-level simulation finds the above time used by inputting a parameter into a lower-level model which is, e.g., a machine learning model, the parameter being set for "the total workload," "the number of workers involved," "the rate of occurrence of a stagnation factor that hinders the work," "the level of proficiency of workers," "decrease in concentration due to fatigue," and the like in a case where the work is performed mainly by a person and set for "time taken by work target recognition processing," the "success rate of recognition," and the like in a case where the work is performed mainly by a machine, such as a robot.

Higher-level simulation does not need fine setting of indeterminate parameters and has low processing load compared to the latter lower-level simulation and therefore has an advantage of, e.g., producing results fast. With lower-level simulation, on the other hand, improvement in accuracy can be expected, but processing load tends to be heavy because it handles detailed parameters, and it takes a long time to produce results compared to higher-level simulation. Also, an indeterminable parameter needs to be complemented by a default value, an average value found from random values, a variance value, or the like, which leads to a decrease in accuracy and an increase in processing load.

Thus, in the embodiment shown below, data actually measured for various types of work to be inputted (hereinafter referred to as "actual measurement data") and data generated by the lower-level simulation (hereinafter referred to as "sample data") are stored in association with parameters (feature values) representing the characteristics of the work. Then, if sample data associated with a parameter similar to a parameter representing predicted work is stored, higher-level simulation is performed using this sample data to find a predicted value related to the higher-level process 31.

Also, if sample data associated with a parameter similar to a parameter representing predicted work is not stored, lower-level simulation is performed for a lower-level process 32 of this higher-level process 31 to generate data complementing sample data (i.e., data to be added as sample data; hereinafter referred to as "complementary data"), and higher-level simulation is performed using the sample data and the complementary data (or only the complementary data) to find a predicted value related to the higher-level process 31.

In this way, a highly accurate predicted value can be found efficiently as follows: if sample data associated with a parameter similar to a parameter representing predicted work is stored, higher-level simulation is performed using sample data, and if sample data associated with a parameter similar to a parameter representing predicted work is not stored, lower-level simulation is performed to generate necessary complementary data, and then higher-level simulation is performed. The following description assumes an example where the work is work related to warehouse operation.

Figure 2:
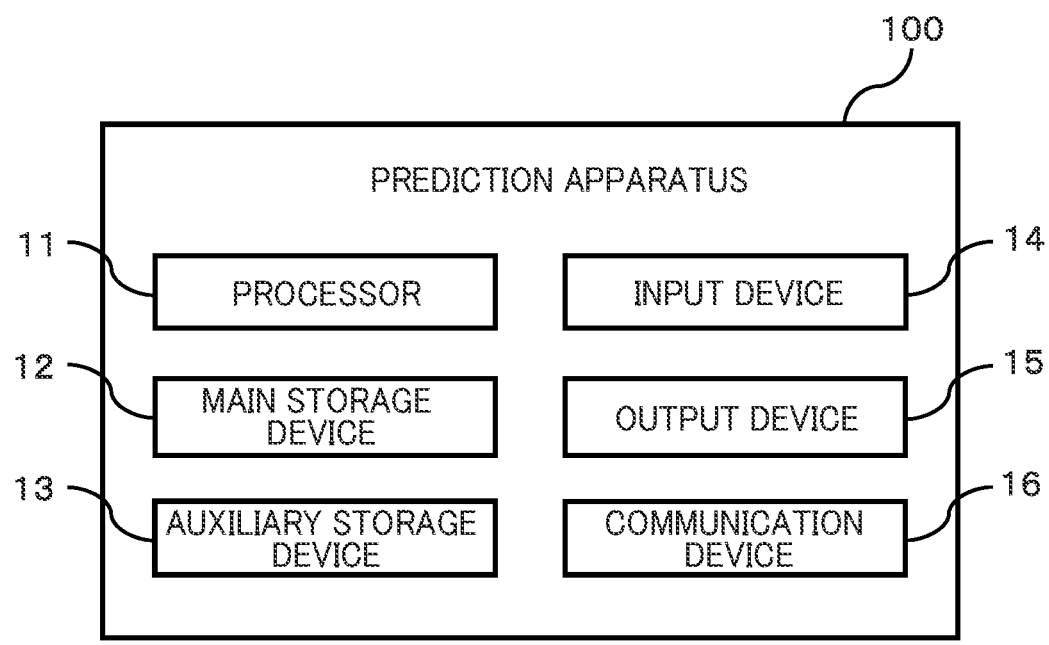
FIG. 2 is a diagram showing the hardware configuration of a prediction apparatus.

FIG. 2 shows the hardware configuration of an information processing device (hereinafter referred to as a "prediction apparatus 100") used to implement the above mechanism. As shown in FIG. 2, the prediction apparatus 100 includes a processor 11, a main storage device 12, an auxiliary storage device 13, an input device 14, an output device 15, and a communication device 16. Note that the prediction apparatus 100 may be implemented using virtual information processing resources such as, for example, a cloud server provided by a cloud system. Also, the prediction apparatus 100 may be configured using a plurality of information processing devices having the configuration shown in FIG. 2.

The processor 11 is configured using, for example, a CPU (Central Processing Unit), an MPU (Micro Processing Unit), a GPU (Graphics Processing Unit), an FPGA (Field-Programmable Gate Array), an ASIC (Application-Specific Integrated Circuit), an AI (Artificial Intelligence) chip, or the like.

The main storage device 12 is a device for storing programs and data and is, for example, a ROM (Read-Only Memory), a RAM (Random-Access Memory), a non-volatile memory (NVRAM (Non-Volatile RAM)), or the like.

The auxiliary storage device 13 is, for example, an SSD (Solid-State Drive), a hard disk drive, an optical storage device (such as a CD (Compact Disc) or a DVD (Digital Versatile Disc)), a storage system, a read/write device for a recording medium such as an IC card, an SD card, or an optical storage medium, a storage area in a cloud server, or the like. A program and data can be read into the auxiliary storage device 13 via a recording medium reading device or the communication device 16. A program and data stored in the auxiliary storage device 13 is read into the main storage device 12 as needed.

The input device 14 is an interface for receiving an input from the outside and is, for example, a keyboard, a mouse, a touch panel, a card reader, a voice input device, or the like.

The output device 15 is an interface for outputting various kinds of information, such as processing progress and processing results. The output device 15 is, for example, a display device that visualizes the above various kinds of information (such as a liquid crystal monitor, an LCD (Liquid Crystal Display), or a graphic card), a device that vocalizes the above various kinds of information (a voice output device (such as a speaker)), and a device that transcribes the above various kinds of information (such as a printing device). Note that, for example, the prediction apparatus 100 may be configured to perform input and output of information with another apparatus via the communication device 16.

The communication device 16 is a device that enables communications with another apparatus. The communication device 16 is a wired or wireless communication interface that enables communications with another apparatus via a communication network (another apparatus being, for example, an information processing device provided at the site where the process is performed or a user terminal (such as a smartphone, a tablet, or a mobile phone)), and is, for example, an NIC (Network Interface Card), a wireless communication module (such as a BLE module or a WiFi module), a USB module, a serial communication module, or the like.

The functions of the prediction apparatus 100 are implemented by the processor 11 reading and executing programs stored in the main storage device 12 or by hardware components (such as an FPGA, an ASIC, or an AI chip) forming the respective functions. The prediction apparatus 100 may have therein, for example, an operating system, a device driver, a file system, a DBMS (DataBase Management System) (such as a relational database or a NoSQL), and the like.

Figure 3:
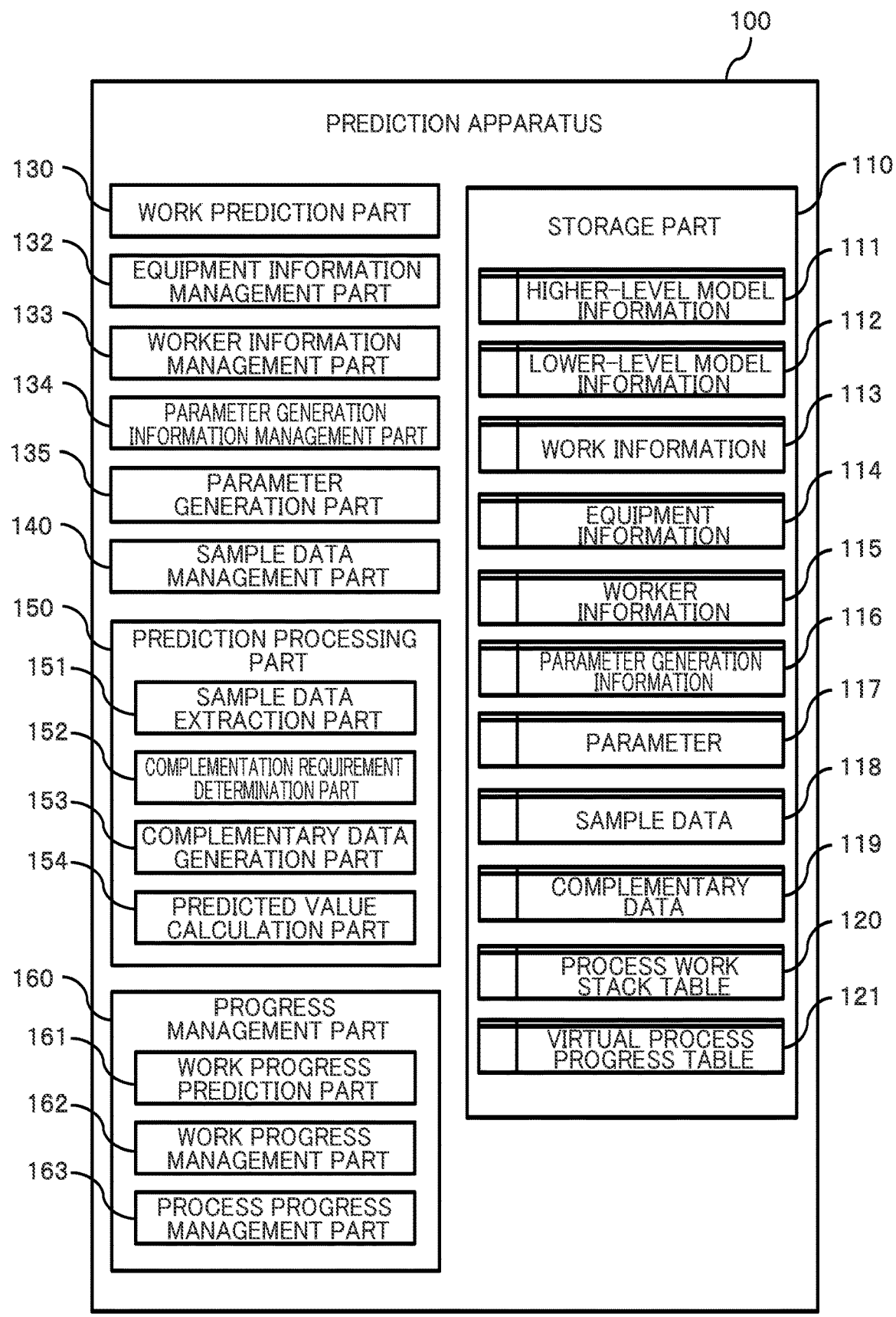
FIG. 3 is a diagram showing main functions of the prediction apparatus.

FIG. 3 shows main functions of the prediction apparatus 100. As shown in FIG. 3, the prediction apparatus 100 includes the following functions: a storage part 110, a work prediction part 130, an equipment information management part 132, a worker information management part 133, a parameter generation information management part 134, a parameter generation part 135, a sample data management part 140, a prediction processing part 150, and a progress management part 160.

The storage part 110 stores therein the following information (data): higher-level model information 111, lower-level model information 112, work information 113, equipment information 114, worker information 115, parameter generation information 116, parameters 117, sample data 118, complementary data 119, virtual process progress table 121, and process work stack table 120. The storage part 110 stores each of these pieces of information as, for example, a table of a database provided by a DBMS or as a file provided by a file system.

The higher-level model information 111 includes data defining a higher-level model (for example, a calculation formula for performing linear prediction, machine learning model definition information). A higher-level model outputs a predicted value related to work generated (predicted) by the work prediction part 130 by performing higher-level simulation using the parameter 117 generated by the parameter generation part 135 as inputs.

The lower-level model information 112 includes data defining a lower-level model (for example, a calculation formula for performing linear prediction, machine learning model definition information). A lower-level model outputs a result such as a predicted value related to work generated by the work prediction part 130 by performing lower-level simulation using, as inputs, the parameter 117 generated by the parameter generation part 135 and an output from lower-level simulation at the previous stage.

The work information 113 includes information on predicted work predicted by the work prediction part 130 (such as the type and workload of the predicted work).

The equipment information 114 is information managed by the equipment information management part 132 and includes information related to equipment at a site where work of the process is carried out. The equipment information 114 is referred to by the parameter generation part 135 and a complementary data generation part 170.

The worker information 115 is data managed by the worker information management part 133 and includes information related to workers that carry out the work of the process. The worker information 115 is referred to by the parameter generation part 135 and the complementary data generation part 170.

The parameter generation information 116 is information managed by the parameter generation information management part 134 and includes information related to how to generate a parameter 117. The parameter generation information 116 is referred to when the parameter generation part 135 generates a parameter 117.

The parameter 117 is information (feature values) representing the features of predicted work, is generated based on the work information 113, the equipment information 114, the worker information 115, and the parameter generation information 116, and is expressed in, for example, vector format. The parameter 117 is inputted to a model (a higher-level model, a lower-level model) in execution of simulation (higher-level simulation, lower-level simulation).

The sample data 118 is information managed by the sample data management part 140 and includes information representing indicators related to a process. The sample data 118 is generated based on information obtained by actual measurements under various situations of the process and on information obtained by lower-level simulation.

The complementary data 119 is data complementing the sample data 118 insufficient in execution of higher-level simulation and is generated by the complementary data generation part 153 to be described later.

The virtual process progress table 121 is information managed by the progress management part 160 and includes information related to a virtual progress of a process based on a predicted value generated by the prediction processing part 150.

The process work stack table 120 is information managed by the progress management part 160 and includes information related to a virtual progress of each work.

The work prediction part 130 predicts work inputted to a process (such as the type and workload of the work) using a publicly-known workload prediction method and generates the work information 113.

Figure 4:
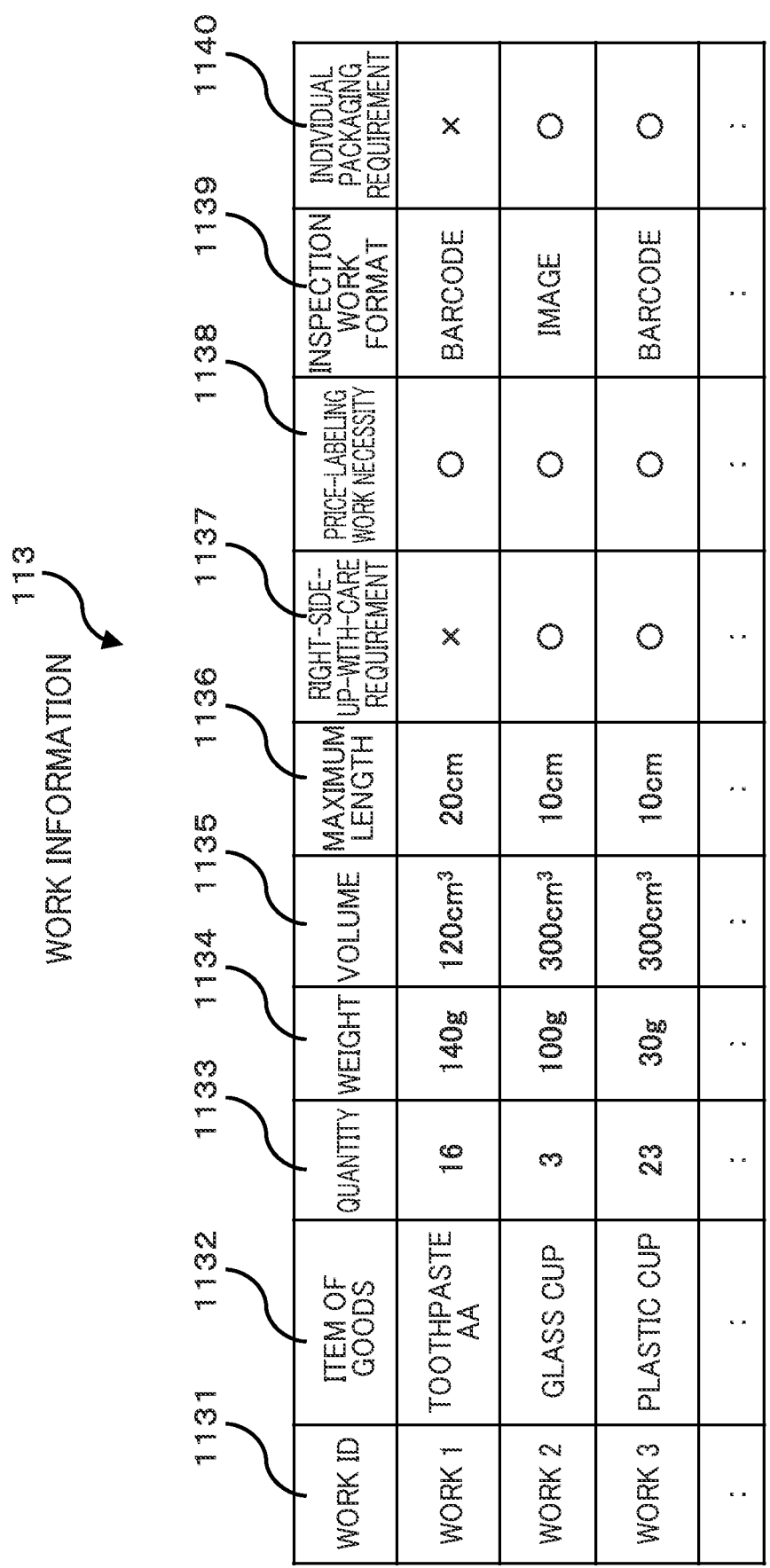
FIG. 4 is an example of work information.

FIG. 4 shows an example of the work information 113. As shown in FIG. 4, the work information 113 exemplified is formed by one or more entries (records) having the following items: work ID 1131, item of goods 1132, quantity 1133, weight 1134, volume 1135, maximum length 1136, right-side-up-with-care requirement 1137, price-labeling work necessity 1138, inspection work format 1139, and individual packaging requirement 1140.

In the work ID 1131, a work ID which is the identifier of work is set. In the item of goods 1132, information indicating an item of goods handled in the work is set (in this example, the name of the item of goods). In the quantity 1133, the quantity of the item of goods handled in the work is set. In the weight 1134, the weight of each item of goods is set. In the volume 1135, the volume of each item of goods is set. In the maximum length 1136, the maximum length of the item of goods is set. In the right-side-up-with-care requirement 1137, information indicating whether care is needed not to place the item of goods upside down in handling the item of goods is set (in this example, "o" means necessary, and "x" means unnecessary). In the price-labelling work necessity 1138, information indicating whether price labeling is needed for the work of the item of goods is set (in this example, "o" means necessary, and "x" means unnecessary). In the inspection work format 1139, information indicating the format for inspection work for the product is set. In the individual packaging requirement 1140, information indicating whether the product is to be individually packaged is set (in this example, "o" means necessary, and "x" means unnecessary).

Referring back to FIG. 3, the equipment information management part 132 manages the equipment information 114. The worker information management part 133 manages the worker information 115. The parameter generation information management part 134 manages the parameter generation information 116. The equipment information 114 and the worker information 115 may be, for example, inputted via the input device 14 or automatically acquired from, e.g., the site where the process is performed via the communication device 16.

The parameter generation part 135 generates the parameter 117 by referring to the work information 113, at least one of the equipment information 114 and the worker information 115, and the parameter generation information 116.

FIG. 5 shows an example of the equipment information 114. The equipment information 114 exemplified is an example for a case where equipment is a work robot such as a goods handling robot. As shown in FIG. 5, the equipment information 114 exemplified is formed by one or more entries (records) having the following items: equipment ID 1411, maximum speed of arm's vertical movement 1142, maximum speed of arm's horizontal movement 1143, recognition module's average performance value 1144, and hardware performance deterioration margin 1145.

In the equipment ID 1411, an equipment ID which is the identifier of equipment is set. In the maximum speed of arm's vertical movement 1142, the maximum speed of vertical movement of an arm of the equipment is set. In the maximum speed of arm's horizontal movement 1143, the maximum speed of horizontal movement of the arm of the equipment is set. In the recognition module's average performance value 1144, an average of the time it takes for an object recognition device in the equipment to acquire the features of an object being carried on a conveyor belt is set. In the hardware performance deterioration margin 1145, information indicating the usage limit (deterioration margin) of hardware (for example, a motor) in the equipment is set.

FIG. 6 shows an example of the worker information 115. In the worker information 115, real-time information related to a worker working at the site where the process is performed is managed. As shown in FIG. 6, the worker information 115 exemplified is formed by one or more entries (records) having the following items: product feature value 1151, environment feature value 1152, work content 1153, period of experience 1154, time spent 1155, and consecutive hours of engagement In the product feature value 1151, information indicating the features of the product handled by a worker is set (in this example, a combination of elements $z_1$ to $z_3$). In the environment feature value 1152, information indicating the work environment of the worker is set (in this example, the length of the conveyor belt for conveying products). In the work content 1153, information indicating the content of the work performed by the worker is set. In the period of experience 1154, the period of experience in the work assumed for the worker performing the work is set. In the time spent 1155, the time it takes for the worker to perform the work is set. In the consecutive hours of engagement 1156, the upper limit of hours for which the worker can engage in the work consecutively is set.

FIG. 7 shows an example of the parameter generation information 116. FIG. 7(*a*) is the parameter generation information 116 for a case where the work of the process is performed using equipment (a robot), and FIG. 7(*b*) is the parameter generation information 116 for a case where the work of the process is performed by a worker. As shown in FIG. 7, the parameter generation information 116 is formed by one or more entries (records) having the following items: parameter ID 1161, acquisition source 1162, item used 1163, and calculation formula 1164.

In the parameter ID 1161, a parameter ID which is the identifier of a parameter (a feature value) is set. In the acquisition source 1162, information indicating the source from which information (an item) used for calculation of the parameter is acquired is set (such as "work information" (in a case where the acquisition source is the work information 113), "equipment information" (in a case where the acquisition source is the equipment information 114), and "worker information" (in a case where the acquisition source is the worker information 115)). In the item used 1163, information identifying one or more items acquired from the acquisition source is set. In the calculation formula 1164, a calculation formula for finding the parameter is set.

Based on at least one of the work information 113, the equipment information 114, and the worker information 115, and the parameter generation information 116 exemplified above, the parameter generation part 135 generates, as the parameter 117, feature vectors having elements such as, for example, parameters acquired from the work information 113, namely the number of items of goods (the number of the types of the item of goods 1132), the weight 1134, the maximum length 1136, and the right-side-up-with-care requirement 1137 and the capability and performance acquired from the equipment information 114 (namely the maximum speed of arm's vertical movement 1142, the maximum speed of arm's horizontal movement 1143, the recognition module's average performance value 1144, and the hardware performance deterioration margin 1145).

FIG. 8(*a*) shows an example parameter 117. The parameter 117 exemplified is formed by one or more entries (records) having the following items: data ID 1171 and parameter element 1172. In the data ID 1171, a parameter ID which is the identifier of the parameter 117 is set. In the parameter element 1172, parameter elements ($z_1$ to $z_6$) are set.

Referring back to FIG. 3, the sample data management part 145 manages, as sample data 118, sample data acquired from the site where the process is performed.

FIG. 8(b) shows an example of sample data 118. The sample data 118 exemplified is formed by one or more entries (records) having the following items: data ID 1181, parameter element 1182, time used 1183, and rate of change of each parameter element 1184.

In the data ID 1181, a sample data ID which is the identifier of sample data 118 is set. In the parameter element 1182, parameter elements ($z_1$ to $z_6$) associated with the sample data 118 are set. Note that the parameter element 1182 serves as an index in searching for sample data 118 similar to the parameter 117 inputted to higher-level simulation. In the time used 1183, an actual measurement value or a result of lower-level simulation of a productivity indicator (such as time used) is set. In the rate of change of each parameter element 1184, calculated values of the rates of change of the respective parameter elements are set. A description will be given later of how to calculate the rate of change of each parameter element. Note that the complementary data 119 has the same structure as the sample data 118.

Referring back to FIG. 3, the prediction processing part 150 finds a predicted value as an indicator related to work productivity by executing simulation (higher-level simulation, lower-level simulation). If sample data 118 associated with a parameter similar to the parameter 117 representing predicted work is stored, the prediction processing part 150 finds a predicted value for a higher-level process 31 by performing higher-level simulation using this sample data 118.

Meanwhile, if sample data 118 associated with a parameter similar to the parameter 117 representing predicted work is not stored, the prediction processing part 150 finds a predicted value for a higher-level process 31 by performing lower-level simulation for a lower-level process 32 of the higher-level process 31 to generate complementary data 119 and then performing higher-level simulation using the sample data 118 and the generated complementary data 119 (or only the generated complementary data 119).

As shown in FIG. 3, the prediction processing part 150 includes a sample data extraction part 151, a complementation requirement determination part 152, the complementary data generation part 153, and a predicted value calculation part 154.

From pieces of sample data 118 stored in the storage part 110, the sample data extraction part 151 extracts sample data 118 associated with a parameter similar to the parameter 117 representing predicted work for which to find a predicted value. Details of how to extract the sample data 118 will be described later.

In executing higher-level simulation, the complementation requirement determination part 152 determines whether sample data 118 associated with a parameter similar to the parameter 117 representing predicted work is stored and thereby determines whether complementary data 119 needs to be generated. Details of how to determine whether complementary data 119 needs to be generated will be described later.

The complementary data generation part 153 generates complementary data 119 by executing lower-level simulation for a lower-level process forming a higher-level process. Details of how to generate the complementary data 119 will be described later.

The predicted value calculation part 154 finds a predicted value by performing higher-level simulation.

Referring back to FIG. 3, the progress management part 160 manages the progress of each process based on results of executing each higher-level simulation. As shown in FIG. 3, the progress management part 160 includes a work progress prediction part 161, a work progress management part 162, and a process progress management part 163.

The work progress prediction part 161 finds the progress amount (progress level) of work based on results of executing higher-level simulation.

The work progress management part 162 manages the progress of work using the process work stack table 120.

FIG. 9 shows an example of the process work stack table 120. As shown in FIG. 9, the process work stack table 120 exemplified is formed by one or more entries (records) having the following items: process ID 1201, work ID 1202, progress level 1203, time used 1204, and virtual start time 1205. In the process ID 1201, a process ID which is the identifier of a process is set. In the work ID 1202, a work ID is set. In the progress level 1203, the current progress level of the process is set. In the time used 1204, the time taken by the work up to the current point is set. In the virtual start time 1205, a virtual start time of the work in terms of simulation is set. Note that this example is for a case where the current time in terms of simulation is "10:00 AM."

The process progress management part 163 shown in FIG. 3 incorporates the progress (completion status) of a process based on the process work stack table 120 into the virtual process progress table 121.

FIG. 10 shows an example of the virtual process progress table 121. The virtual process progress table 121 exemplified is formed by one or more entries (records) having the following items: work ID 1211 and columns 1212 to 1213 for setting the start/end times for each process. In the work ID 1211, a work ID is set. In the columns 1212 to 1213 for setting the start/end times of each process, the start time and the end time of each process are set, respectively. Note that this example is for a case where the current time is "10:00 AM."

<How to Calculate the Rate of Change of Each Parameter Element>

Figure 11:
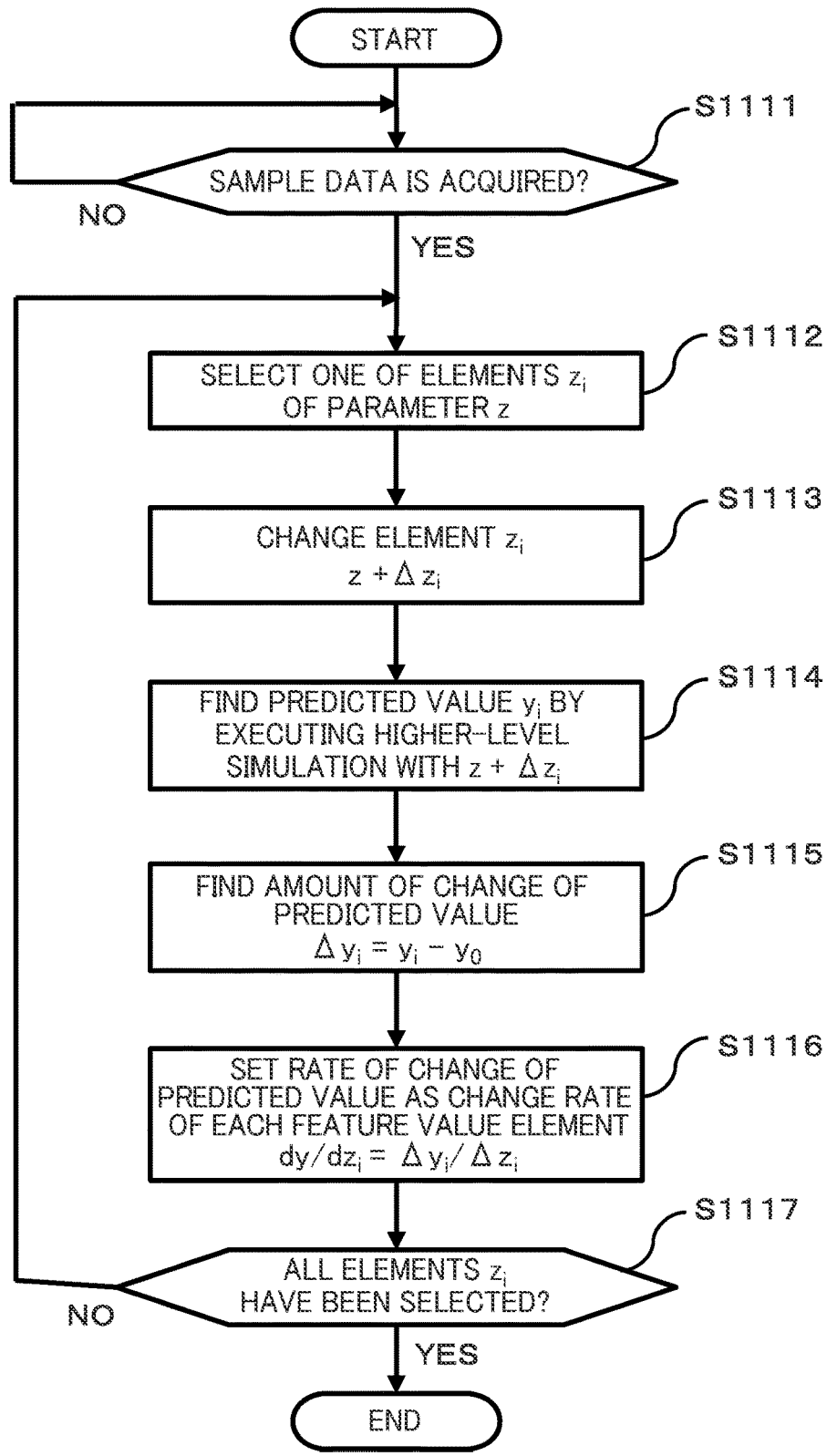
FIG. 11 is a flowchart illustrating how to calculate a rate of change of each parameter element.

FIG. 11 is a flowchart illustrating processing for calculating the rate of change of each parameter element 1184 in sample data 118 in FIG. 8(b) (such processing is hereinafter referred to as "processing S1100 for calculating the rate of change of each parameter element"). With FIG. 11, a description is given below of the processing S1100 for calculating the rate of change of each parameter element.

The sample data management part 140 executes the processing in response to, for example, the prediction apparatus 100 storing new sample data 118 (S1111: YES).

First, the sample data management part 140 selects one of elements $z_i$ of a parameter z (S1112), and infinitesimally changes the selected element $z_i$ ($z+\Delta z_i$ (S1113).

Next, the sample data management part 140 finds a predicted value $y_i$ by executing higher-level simulation with $z+\Delta z_i$ (S1114).

Next, the sample data management part 140 finds the amount of change $\Delta y_i = y_i - y_0$ of the predicted value $y_i$ from the original predicted value $y_0$ (S1115).

Next, the sample data management part 140 sets the rate of change of the predicted value $y_i$ ($=\Delta y_i/\Delta z_i$) in the sample data 118 as a change rate $dy/dz_i$ (S1116).

Next, the sample data management part 140 determines whether all the elements $z_i$ have been selected in S1112 (S1117). If all the elements $z_i$ have been selected (S1117: YES), the processing ends. If all the elements $z_i$ have been unselected (S1117: NO), processing proceeds back to S1112.

<Example of How to Calculate a Predicted Value>

For example, the predicted value calculation part 154 generates a predicted value by performing, in higher-level simulation, linear prediction based on the following formula.

$$y(z + \Delta z) = y(z) + \sum_i \Delta z_i \frac{\partial y(z)}{\partial z_i} \quad \text{(Formula 1)}$$

The left-hand side of the above formula, y(z+Δz), is a predicted value of productivity to be found by the higher-level simulation. The first term on the right-hand side, y(z), is an actual measurement value of a productivity indicator (such as time used for the work). Also, $\Delta z_i$ in the second term on the right-hand side is the difference between a parameter element $z_i$ in the sample data 118 or the complementary data 119 and each parameter element $z_i^0$ of the predicted work. The partial derivative in the second term on the right-hand side is the rate of change of each productivity parameter element $z_i$ (the rate of change of each parameter element 1184 in FIG. 8) and is acquired from the sample data 118 or the complementary data 119.

<How the Complementation Requirement Determination Part 152 Determines Whether Complementation is Required>

The complementation requirement determination part 152 determines whether complementation is required based on the magnitude of the amount of change of a predicted value of an indicator related to predicted work obtained by higher-level simulation, relative to the amount of change of the parameter associated with the sample data 118. Specifically, for example, the complementation requirement determination part 152 determines whether the complementary data 119 needs to be generated, based on a distance $d(z^0, z)$ defined in the following formula.

$$d(z^0, z) = \frac{\left|\sum_i \Delta z_i \frac{\partial y(z)}{\partial z_i}\right|}{|y(z)|} \quad \text{(Formula 2)}$$

$$\Delta z_i = |z_i^0 - z_i| \quad \text{(Formula 3)}$$

In the above formula, $z_i^0$ is an element of the parameter 117 of the predicted work, and $z_i$ is an element of the parameter stored in association with the sample data 118.

The prediction accuracy of an indicator related to predicted work can be enhanced by this complementation requirement based on the magnitude of the amount of change of a predicted value of an indicator related to predicted work by higher-level simulation, relative to the amount of change of the parameter associated with the sample data 118.

The complementation requirement determination part 152 determines that complementary data 119 does not need to be generated if N pieces of sample data 118 with a small distance $d(z^0, z)$ are present near the parameter 117 of the predicted work, and determines that complementary data 119 needs to be generated if not. Specifically, for example, the complementation requirement determination part 152 determines that complementary data 119 does not need to be generated if there is sample data 118 that satisfies the following formula with w being a positive constant, and determines that complementary data 119 needs to be generated if not.

$$d_{total} = \sum_{n=1}^{N} d(z^0 - z^n) < w \quad \text{(Formula 4)}$$

<How to Generate Complementary Data>

The complementary data generation part 153 generates complementary data 119 by generating a parameter to input to lower-level simulation and executing lower-level simulation using the generated parameter. The complementary data generation part 153 generates a parameter to use for the lower-level simulation by, for example, generating a random value in conformity with data distribution gained from the parameter associated with the sample data 118. Then, for example, in a case where the work of the lower-level process 32 is performed mainly by a work robot, the complementary data generation part 153 generates complementary data 119 by executing a simulator that simulates the work of the work robot (hereinafter referred to as a "robot simulator") by using the generated parameter and referring to the equipment information 114.

Figure 12A:
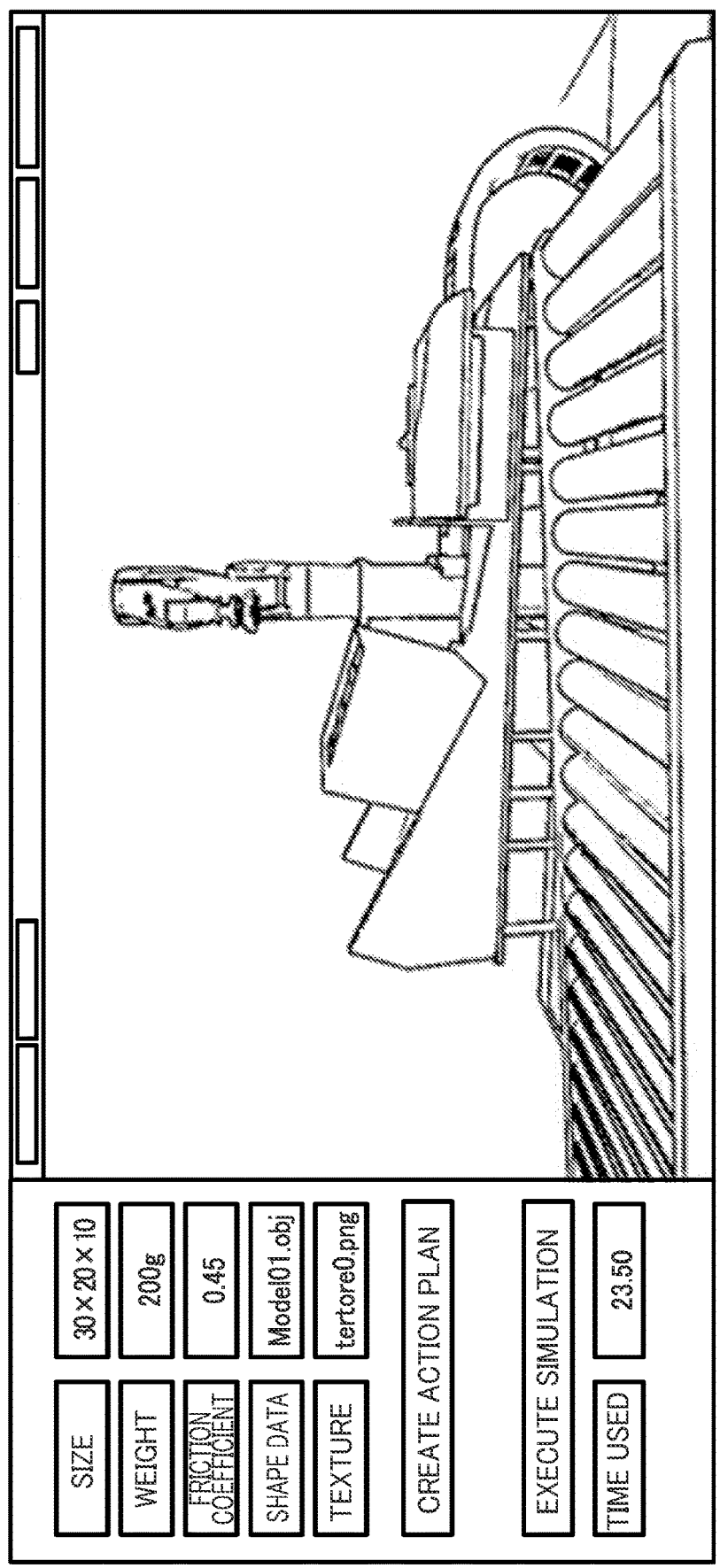
FIG. 12(a) is an example of a screen presented by a robot simulator.
Figure 12B:
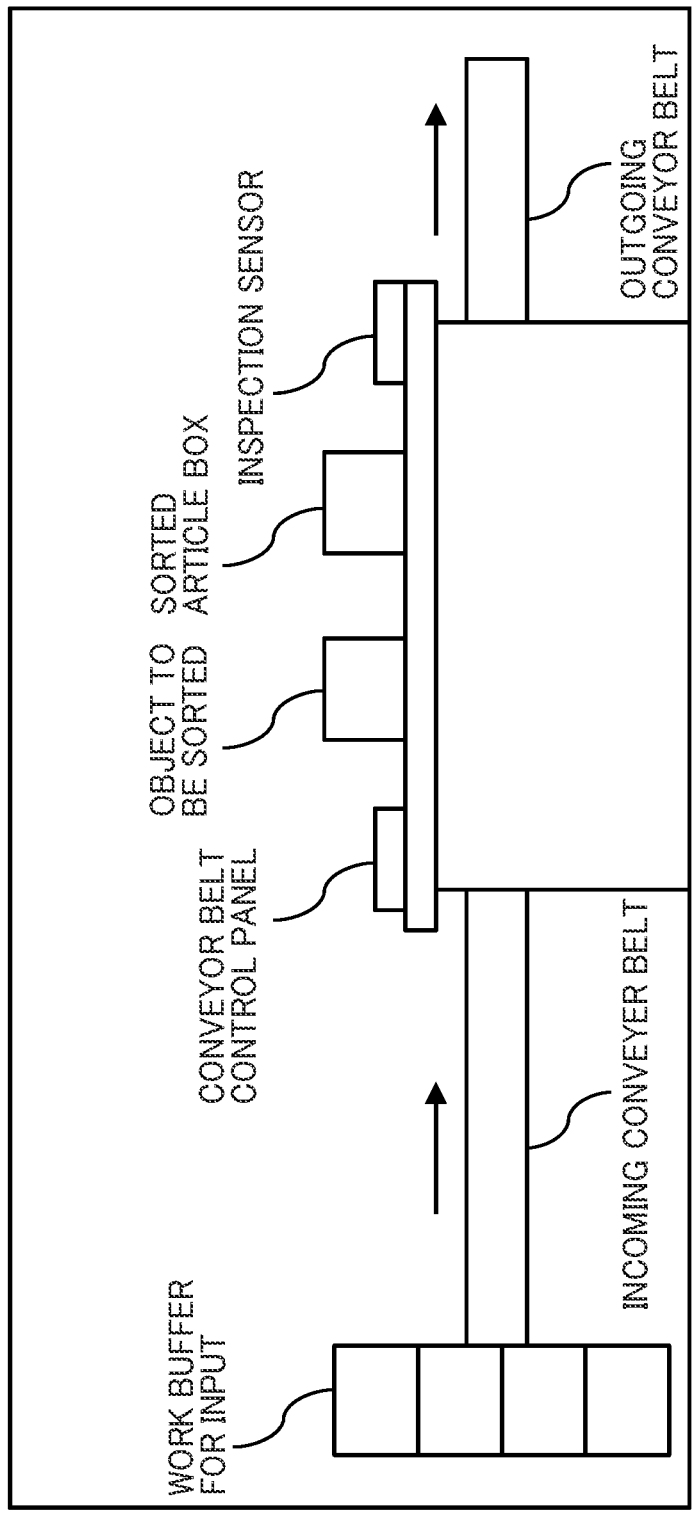
FIG. 12(b) is an example of a screen presented by a manual work simulator.

FIG. 12(*a*) shows an example screen presented by the robot simulator. For example, the robot simulator exemplified executes simulation by setting, via a user interface, data identifying product size, product weight, product's skin friction coefficient, the shape of the product, and the like as parameters, and outputs information corresponding to the complementary data 119. Note that automating the series of processing from the setting of the parameters to the acquisition of the complementary data 119 using an RPA (Robotic Process Automation) or the like enables efficient generation of the complementary data 119 using a robot simulator.

For example, in a case where the work of the lower-level process 32 is performed mainly by a worker (a person), the complementary data generation part 153 generates complementary data 119 by executing a simulator that simulates the work of a person (hereinafter referred to as a "manual work simulator") by using the generated parameter and referring to the worker information 115.

FIG. 12(*b*) shows an example screen presented by the manual work simulator. For example, the manual work simulator exemplified executes simulation by setting, via a user interface, data identifying, e.g., the features of a product (such as product size, product weight, product's skin friction coefficient, product shape, and package shape), the features of the work environment (such as an input work buffer, an incoming conveyer belt, an outgoing conveyer belt, a work desk, a conveyor belt control panel, and an inspection sensor), the period of experience of the worker, the content of work, and the like as parameters, and outputs information corresponding to the complementary data 119. Note that automating the series of processing from the setting of the parameters to the acquisition of the complementary data 119 using an RPA or the like enables efficient generation of the complementary data 119 using a manual work simulator.

FIG. 13 shows an example of an RPA script used in automatic simulator execution. FIG. 13(*a*) is an example of screen information used in execution of an RPA script. FIG. 13(*b*) is an example of an RPA script for automatic simulator execution.

By thus performing lower-level simulation using an existing simulator, the lower-level simulation can be performed at low costs in a convenient and facilitated manner. Also, the automatic simulator execution using an RPA script allows lower-level simulation to be performed efficiently.

<Prediction Processing>

Figure 14:
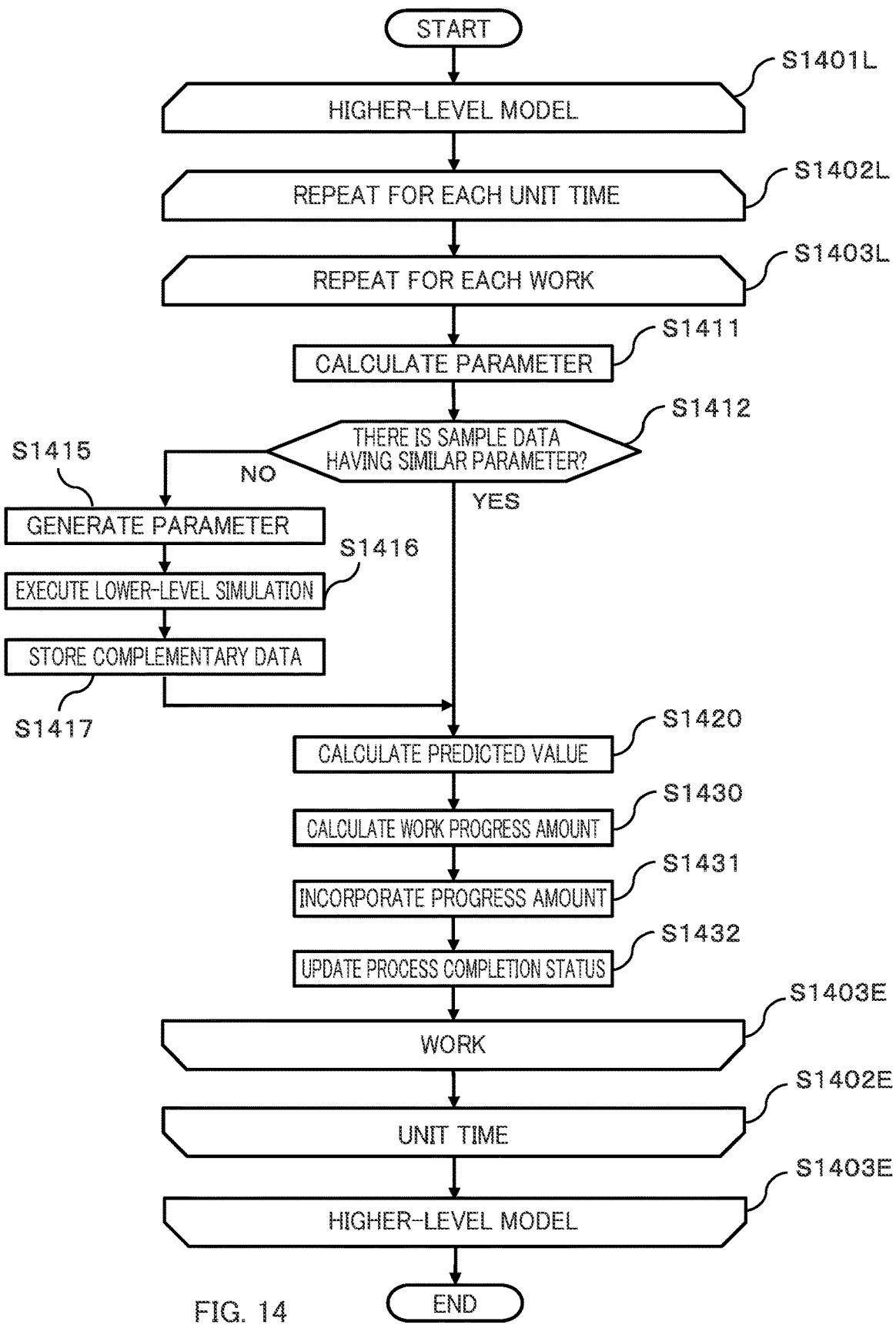
FIG. 14 is a flowchart illustrating prediction processing.

FIG. 14 is a flowchart illustrating processing performed by the prediction apparatus 100 in generating a predicted value (such processing is hereinafter referred to as "prediction processing S1400"). With FIG. 14, a description is given below of the prediction processing S1400.

As shown in FIG. 14, the prediction processing S1400 includes loop processing for each upper-level model as a simulation target, for each preset unit time, and for each work predicted by the work prediction part 130 (S1401S to S1401E, S1402S to S1402E, and S1403S to S1403E, respectively). Note that it is assumed here that at the time the prediction processing S1400 starts, the work information 113 has already been generated by the work prediction part 130.

In the above loop processing, first, the parameter generation part 135 generates a parameter 117 by referring to the work information 113, at least one of the equipment information 114 and the worker information 115, and the parameter generation information 116 (S1411).

Next, the sample data extraction part 151 of the prediction processing part 150 searches for sample data 118 associated with a parameter similar to the generated parameter 117, and the complementation requirement determination part 152 determines whether the sample data 118 associated with a parameter similar to the parameter 117 representing predicted work has been successfully extracted (S1412). If such sample data 118 has been successfully extracted (S1412: YES), the predicted value calculation part 154 calculates a predicted value by performing higher-level simulation using the extracted sample data 118 (S1420).

Meanwhile, if such sample data 118 has not been successfully extracted (S1412: NO), the parameter generation part 135 generates a parameter to use for lower-level simulation (S1415), and the complementary data generation part 153 generates complementary data 119 by performing lower-level simulation using the generated parameter as an input and stores the complementary data 119 (S1415, S1416). Then, the predicted value calculation part 154 finds a predicted value by performing higher-level simulation using the generated sample data 118 and the generated complementary data 119 (or only the generated complementary data 119) (S1420).

Next, the work progress prediction part 161 of the progress management part 160 finds the progress level of the work based on the results of executing the higher-level simulation (S1430).

Next, the work progress management part 162 incorporates the progress level thus found into the process work stack table 120 (S1431).

Next, the process progress management part 163 gains information on whether the process is complete based on the process work stack table 120 and incorporates the information thus gained into the virtual process progress table 121 (S1432).

<Presentation of Prediction Results>

Figure 15:
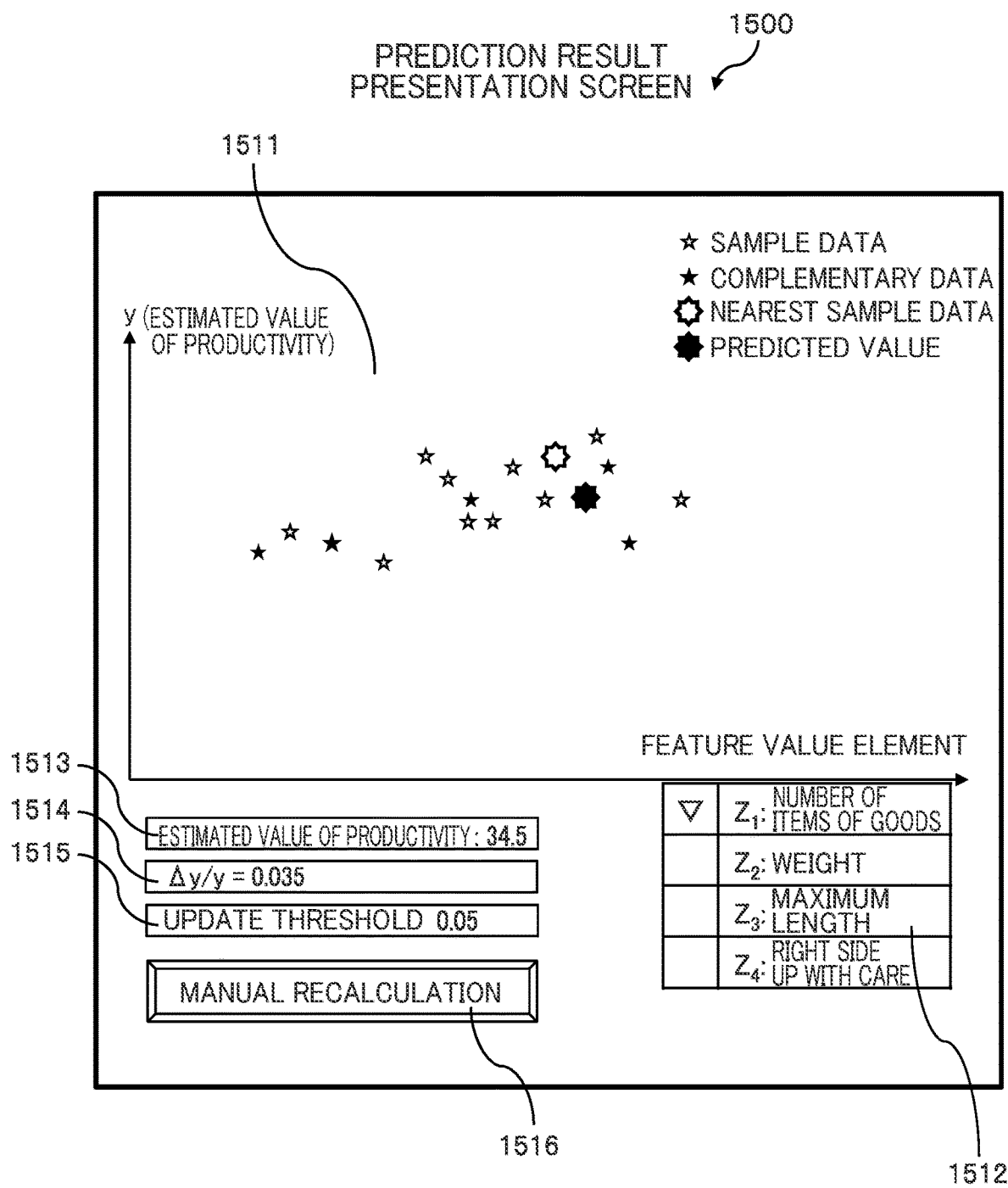
FIG. 15 is an example of a prediction result presentation screen.

FIG. 15 is an example of a screen that the prediction apparatus 100 presents to a user as prediction results (such a screen is hereinafter referred to as a "prediction result presentation screen 1500"). As shown in FIG. 15, the prediction result presentation screen 1500 includes: a section 1511 for displaying a graph having any of the elements ($z_1$ to $z_4$) of the parameter z as the horizontal axis and the magnitude of a predicted value y as the vertical axis and plotting a predicted value, sample data, nearest sample data, and complementary data; a list box 1512 for a user to select the element to be shown on the horizontal axis of the graph; a section 1513 for displaying the predicted value (an estimated value of productivity); a section 1514 for displaying the value of $\Delta y/y$ 1514 (which corresponds to the ratio of the second term on the right-hand side to the first term on the right-hand side in Formula 1); a section 1515 for displaying the value of w described above (an update threshold); a manual recalculation button 1516; and the like.

A user can select one of the parameter elements ($z_1$ to $z_4$) for the horizontal axis of the graph by operating the list box 1512. Also, by operating the manual recalculation button 1516, a user can cause the prediction apparatus 100 to re-execute the prediction processing S1400 based on the latest sample data 118. For example, in a case where the value of $\Delta y/y$ 1514 is larger than a preset threshold, a user operates the manual recalculation button 1516 to have the prediction processing S1400 re-executed based on the latest sample data 118.

By referring to the prediction result presentation screen 1500, a user can easily check the relation between the predicted value generated by the prediction processing S1400 and the sample data or the complementary data, as well as the various values used in the prediction processing S1400.

Second Embodiment

Next, as a second embodiment, an example configuration is shown for a case where work is related to planning for running a warehouse (weekly prediction planning). The prediction apparatus 100 of the second embodiment has the same basic configuration as the prediction apparatus 100 of the first embodiment. The following description focuses mainly on the differences from the first embodiment.

FIG. 16 is an example of work information 113 generated by the work prediction part 130 of the prediction apparatus 100 of the second embodiment. As shown in FIG. 16, the work prediction part 130 generates work schedules for a warehouse as work information 113. The work information 113 includes information indicating work plans for each date. The work information 113 exemplified includes pieces of information set for the following items: work, a total number of items of goods in the work, the number of work types, total work weight, an expected number of workers, expected time of completion, and a predicted profit indicator.

FIG. 17 is an example parameter 117 generated by the parameter generation part 135 of the prediction apparatus 100 of the second embodiment. As shown in FIG. 17, the parameter generated in this example has the following elements ($z_1$ to $z_5$) for each work date 1171: a total number of items of goods in the work, the number of work types, total work weight, an expected number of workers, and the number of work robots.

Figure 18:
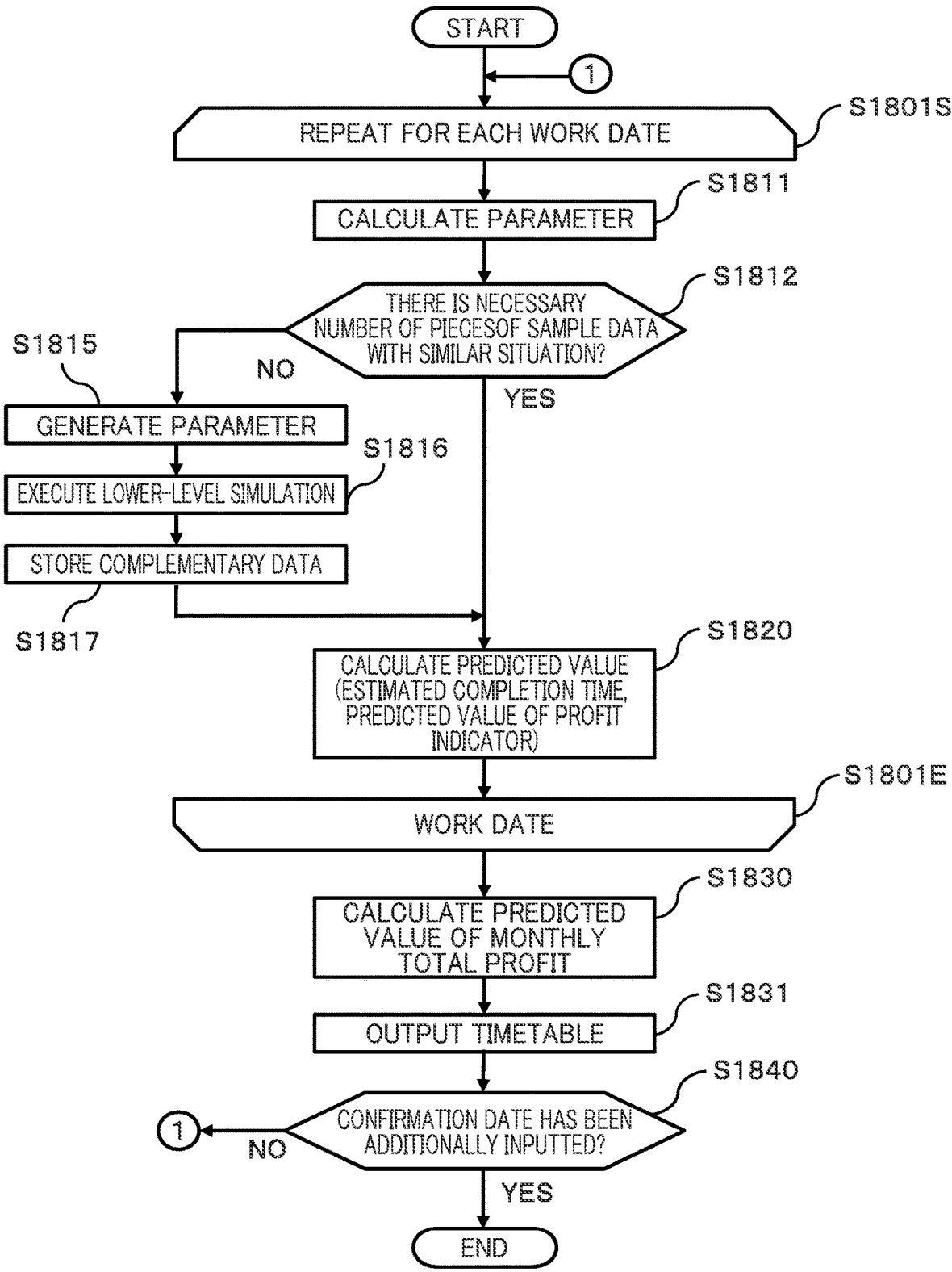
FIG. 18 is a flowchart illustrating prediction processing (the second embodiment).

FIG. 18 is a flowchart illustrating processing performed by the prediction apparatus 100 of the second embodiment in generating a predicted value (hereinafter referred to as "prediction processing S1800"). With FIG. 18, a description is given below of the prediction processing S1800. Note that it is assumed here that at the time the prediction processing S1800 starts, the work information 113 shown in FIG. 16 has already been generated by the work prediction part 130.

As shown in FIG. 18, the prediction processing S1800 includes loop processing (S1801S to S1801E) for each work date in the work information 113.

In the above-described loop processing, first, the parameter generation part 135 generates a parameter 117 (the parameter 117 exemplified in FIG. 17) by referring to the work information 113, at least one of the equipment information 114 and the worker information 115, and the parameter generation information 116 (S1811).

Next, the sample data extraction part 151 of the prediction processing part 150 searches for sample data 118 associated with a parameter similar to the generated parameter 117, and the complementation requirement determination part 152 determines whether the sample data 118 associated with a parameter similar to the parameter 117 representing predicted work has been successfully extracted (S1812). If such sample data 118 has been successfully extracted (S1812: YES), the predicted value calculation part 154 finds a predicted value (in this example, expected completion time of the work, a predicted value of a profit indicator) by performing higher-level simulation using the extracted sample data 118 (S1820).

Meanwhile, if the sample data 118 was not successfully extracted (S1812: NO), the complementary data generation part 153 generates a parameter to use for lower-level simulation (S1815), generates complementary data 119 by performing lower-level simulation using the generated parameter as an input, and stores the complementary data 119 (S1815, S1816). Then, a predicted value is found by higher-level simulation performed using the generated sample data 118 and the generated complementary data 119 (or only the generated complementary data 119) (S1820).

After the loop processing (S1801S to S1801E), next, the predicted value calculation part 154 calculates a predicted value of a monthly total profit (S1830), and generates and outputs a timetable for a predetermined period, the timetable stating calculated predicted values (the expected completion time of the work, the predicted value of a profit indicator, the predicted value of monthly total profit) (S1831).

Next, the prediction processing part 150 determines whether an additional user input of confirmation date has been received (S1840). If an additional input has been received (S1840: YES), the confirmation date received is added to the work date, and the processing from S1801S is performed. If no additional input has been received (S1840: NO), the prediction processing S1800 ends.

In this way, the configuration of the first embodiment can also be applied to a case of predicting indicators of work related to planning for running a warehouse and can predict indicators of work related to planning for running a warehouse efficiently with high accuracy.

Third Embodiment

A third embodiment shows an instance of how the mechanism of the prediction apparatus 100 of the first embodiment is applied to a logistics operation system that performs work related to logistics operations (such as inspection, assortment, and packaging) using autonomous control robots. The logistics operation system exemplified below includes a system in which individual robots operate by autonomously determining the situation (hereinafter referred to as an "autonomous action system") and a system that manages overall operations of the plurality of robots by instructing work outlines to the plurality of robots (hereinafter referred to as a "coordination management system").

Figure 19:
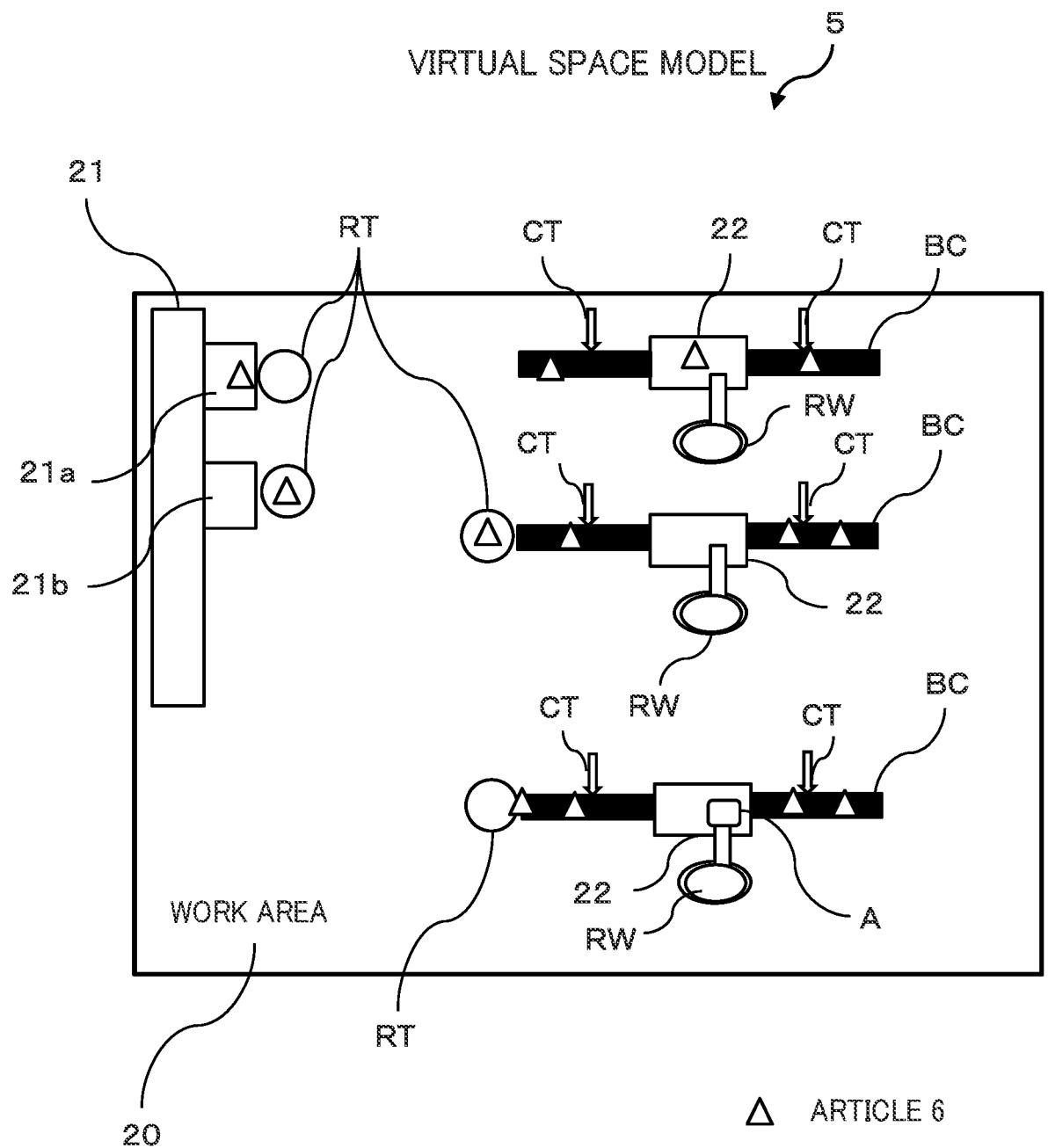
FIG. 19 is an example of a virtual space model (a third embodiment).

FIG. 19 is a virtual space model 5 of a work site, the model being used in simulation of a logistics operation system. As shown in FIG. 19, the virtual space model 5 includes a carry-in apparatus 21 that carries in articles 6 as work objects into a work area 20 and has a plurality of carry-in entrances 21a, a plurality of transport robots RT that transport the articles 6 carried into the work area 20 from the respective carry-in entrances 21a, a plurality of work robots RW that perform work (such as inspection, assortment, or packaging) on the articles 6, a plurality of work tables 22 on which the work robots RW perform the work on the articles 6, a plurality of conveyor belts BC for conveying the articles 6 (a conveyor belt that conveys the articles 6 to a work position, a conveyor belt that carries out the articles 6 after the work), and a plurality of article counting apparatuses CT that count the number of articles 6 placed on the conveyor belts BC (the number of articles 6 before the work, the number of articles 6 after the work). An attachment A is replaceable with respect to the work robots RW, and the type of work to perform on the articles 6 can be changed by the replacement of the attachment A. Replacement of the attachment A takes a predetermined period of time.

As higher-level simulation, the prediction apparatus 100 performs simulation of the coordination management system with respect to the virtual space model 5. Also, as lower-level simulation, the prediction apparatus 100 performs simulation of the autonomous action system with respect to the virtual space model 5. For instance, the prediction apparatus 100 performs higher-level simulation with an aim to evaluate the efficiencies of an algorithm for issuing work instructions to the transport robots RT based on the number of pre-work articles (unprocessed articles) placed on the conveyor belts BC and an algorithm for issuing instructions to the work robots RW to replace the attachment A based on the number of pre-work articles placed on the conveyor belts BC. Also, for instance, the prediction apparatus 100 performs lower-level simulation with an aim to evaluate the efficiencies of an algorithm for avoidance of collision between the transport robots RT and an algorithm for recognition of work objects.

The simulation of the operations of the work robots RW as the lower-level simulation can be performed using a method similar to the method using the robot simulator described in the first embodiment (e.g., FIG. 12(a)). Meanwhile, the simulation of the operations of the transport robots RT is performed using, for example, the method described below.

Figure 20:
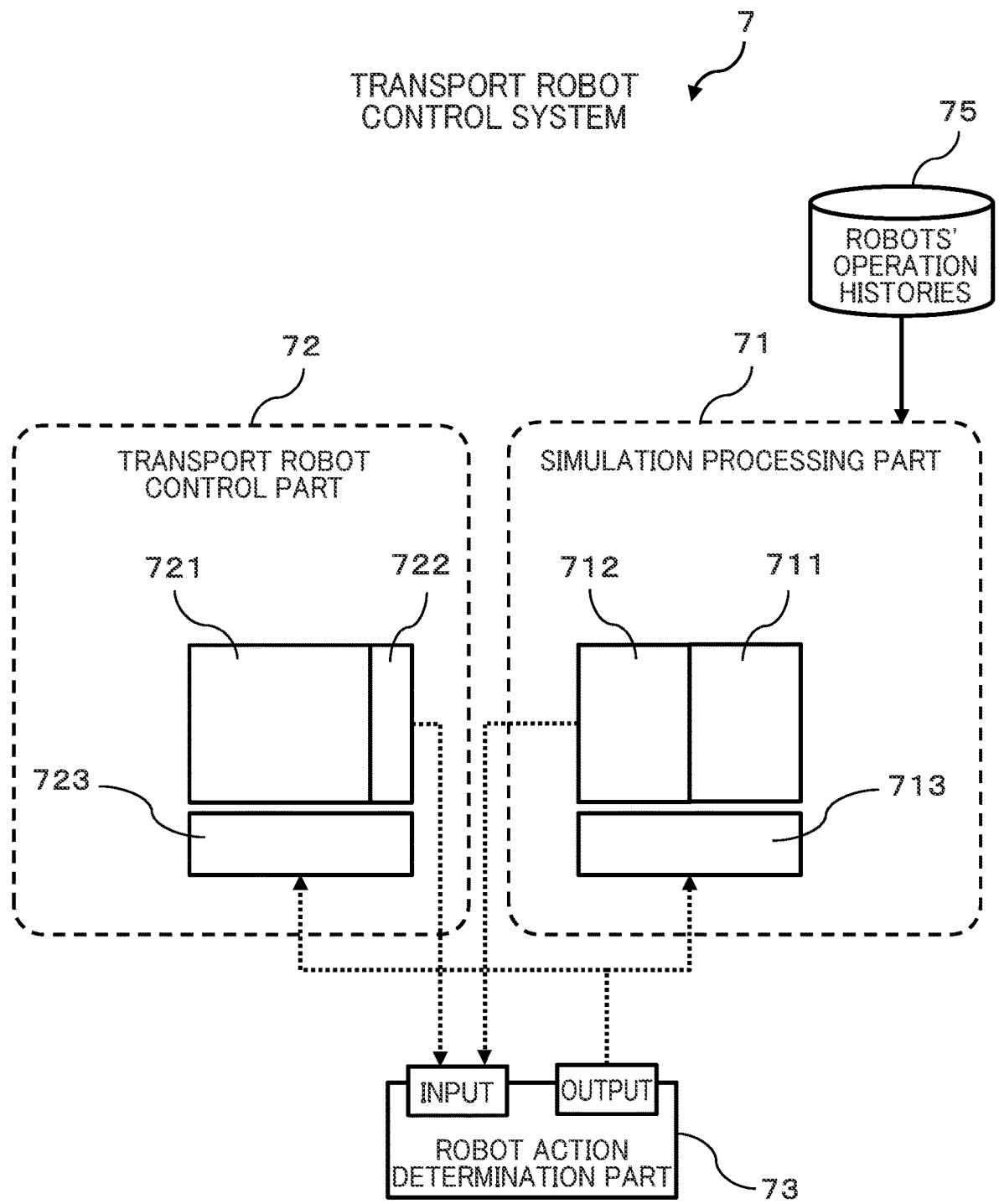
FIG. 20 is an example of a transport robot control system (the third embodiment).

FIG. 20 is an example of an information processing system that performs simulation of the operations of the transport robots RT as lower-level simulation (such system is hereinafter referred to as a "transport robot control system 7"). The transport robot control system 7 includes the functions of the prediction apparatus 100 of the first embodiment.

As shown in FIG. 20, the transport robot control system 7 includes a simulation processing part 71, a transport robot control part 72, and a robot action determination part 73. Examples of a publicly-known robot control system having such a configuration include an ROS (Robot Operating System) and one by Issac.

The simulation processing part 71 has a physical behavior simulation part 711 that performs simulation of the physical behaviors of the transport robots RT, a three-dimensional video rendering part 712 that generates a three-dimensional simulation video of the transport robots RT, and an abstraction API 713 that receives control instructions from the robot action determination part 73. Note that the simulation processing part 71 can acquire operation histories 75 of the transport robots RT located in the work area 20.

As shown in FIG. 20, the transport robot control part 72 has an actual robot control part 721 that controls the actual transport robots RT, sensor devices 722 (image capturing devices (cameras), various sensors) provided at the transport robots RT and the work area 20, and an abstraction API 723 that receives control instructions from the robot action determination part 73.

Figure 21:
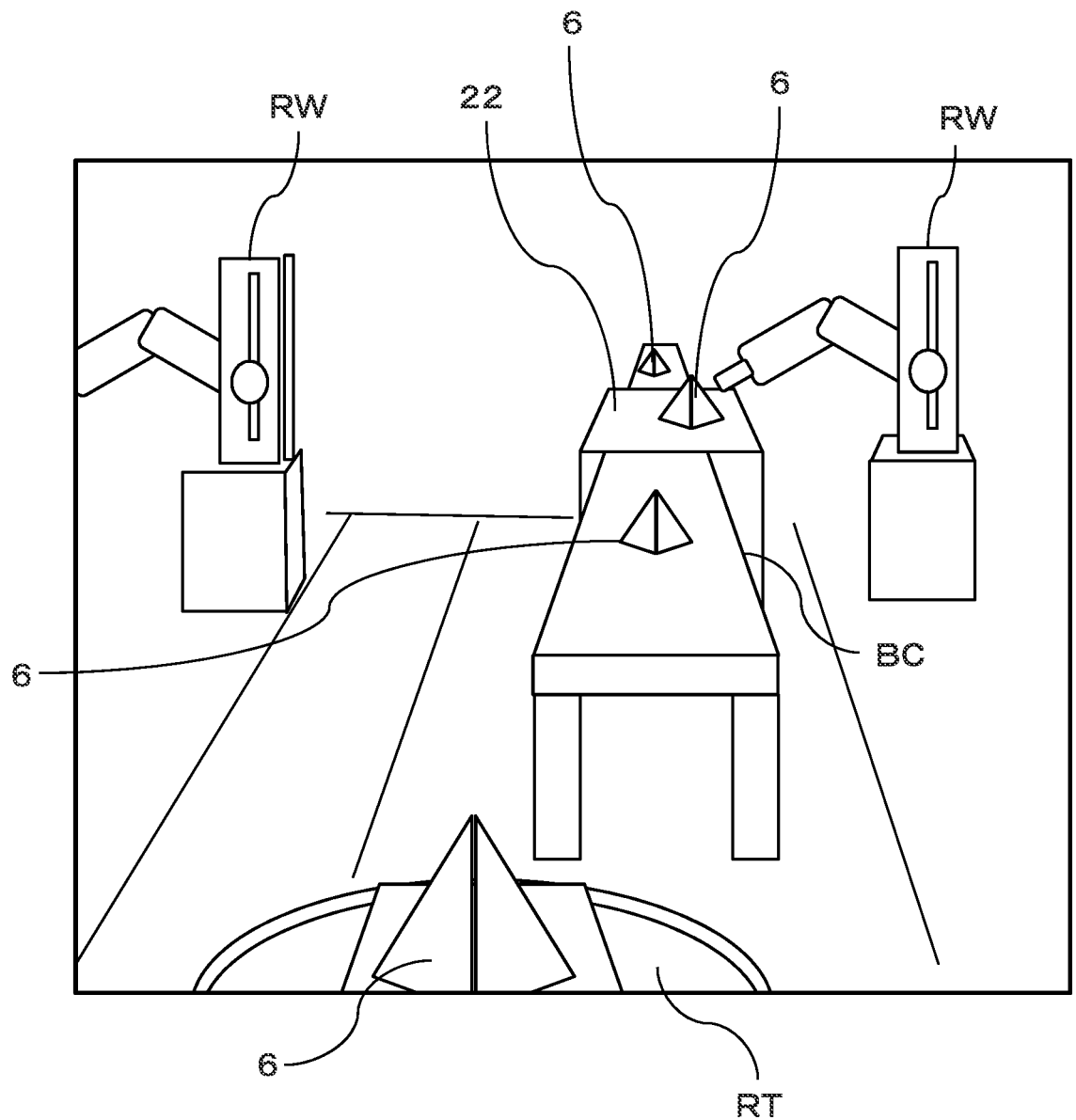
FIG. 21 is an example of a three-dimensional simulation video (the third embodiment).

The robot action determination part 73 determines the action that each transport robot RT is to perform, based on preset data indicating operational instructions and sensor data inputted from the simulation processing part 71 and the transport robot control part 72 (video data or image data captured by the image capturing devices, measurement values obtained by the various sensors), and then inputs control instructions (such as control signals for motors (actuators)) in accordance with the determination results to the simulation processing part 71 or the transport robot control part 72. The above determination is performed using, for example, a machine learning model trained based on training data which are based on, e.g., the past operation histories of the transport robots RT. Note that FIG. 21 shows an example of a three-dimensional simulation video generated by the three-dimensional video rendering part 712 as sensor data.

In the machine learning model described above, control instructions are outputted in accordance with the data indicating operational instructions to cause a transport robot RT to move to one of the carry-in entrances 21a of the carry-in apparatus 21, receive an article 6, and transport the article 6 thus received to the conveyor belt BC instructed. Also, in a case where the transport robot RT may collide with another transport robot RT or an obstacle, the machine learning model is trained to perform operation control (such as changing in direction or speed adjustment) to avoid collision. The degree of the above-described operation control can be adjusted by, for example, setting of a penalty value in the event of collision.

The simulation processing part 71 performs simulation of how the transport robots RT would behave if the transport robots RT were controlled in accordance with the control instructions inputted from the robot action determination part 73, and inputs sensor data generated based on the simulation results to the robot action determination part 73. Examples of the behaviors include receiving a control instruction, moving to one of the carry-in entrances 21a of the carry-in apparatus 21, receiving an article 6, moving to a conveyor belt BC to which to convey the article 6, and placing the article 6 on the conveyor belt BC. The simulation processing part 71 stores simulation results (log information) as sample data 118. The simulation processing part 71 also calculates the time spent by the transport robot RT to perform the action in accordance with the control instruction, generates sample data 118 including the calculated time spent, and stores the sample data 118.

The transport robot control part 72 controls the transport robots RT in accordance with the control instructions inputted from the robot action determination part 73. The transport robot control part 72 also inputs sensor data to the robot action determination part 73.

Figure 22:
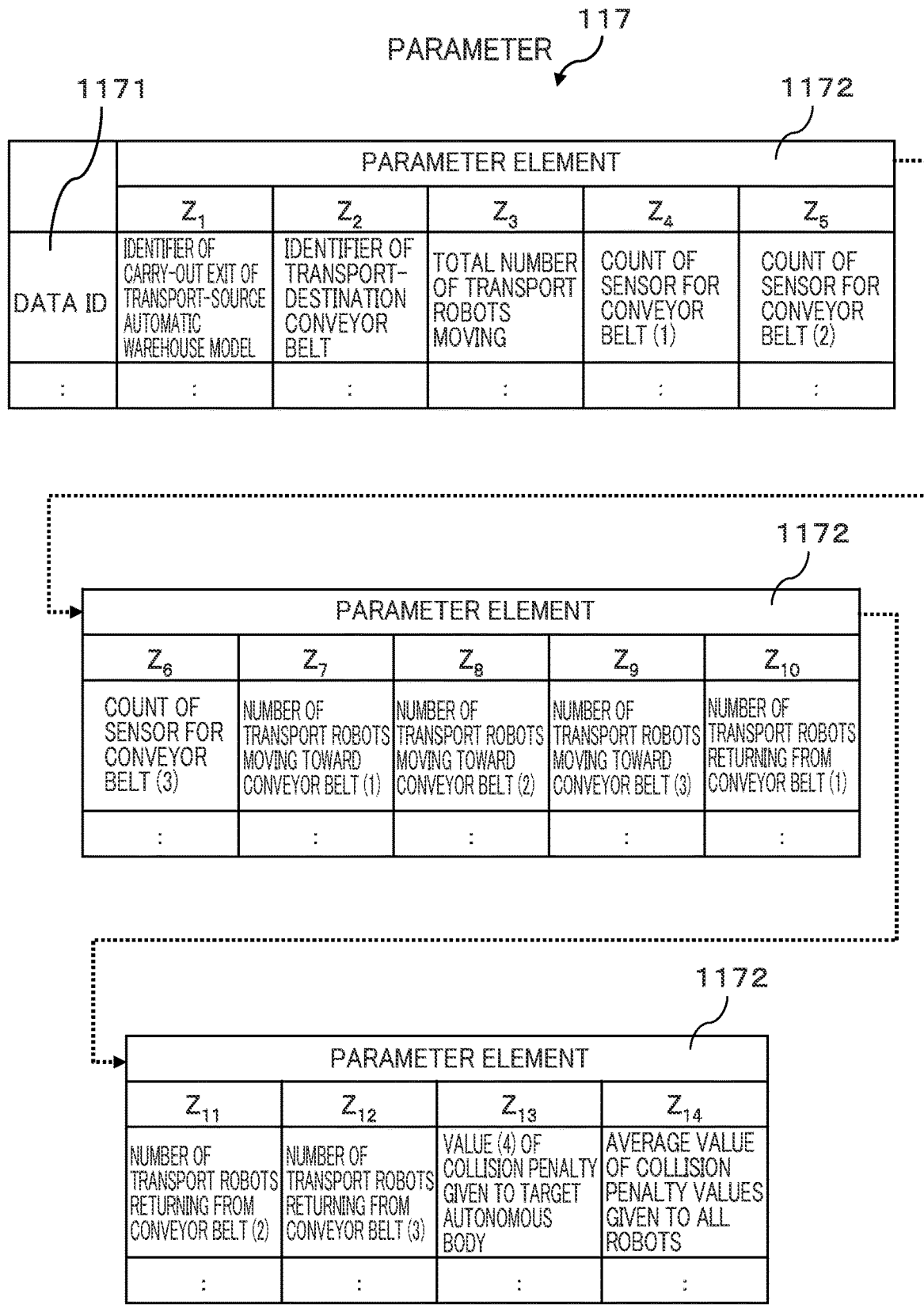
FIG. 22 is an example of a parameter (the third embodiment).

FIG. 22 is an example parameter 117 generated by the parameter generation part 135 of the prediction apparatus 100. As shown in FIG. 22, the parameter generated in this example has the following elements ($z_1$ to $z_{14}$) for each data ID 2111: the identifier of a carry-out exit of a transport-source automatic warehouse model, the identifier of a transport-destination conveyor belt, a total number of transport robots moving, the count of a sensor for a conveyor belt (1), the count of a sensor for a conveyor belt (2), the count of a sensor for a conveyor belt (3), the number of transport robots moving toward the conveyor belt (1), the number of transport robots moving toward the conveyor belt (2), the number of transport robots moving toward the conveyor belt (3), the number of transport robots returning from the conveyor belt (1), the number of transport robots returning from the conveyor belt (2), the number of transport robots returning from the conveyor belt (3), the value (4) of a collision penalty given to a target autonomous body, and an average value of collision penalty values given to all the robots.

Note that regarding the operations of the transport robots RT other than the transport robot RT of note, which are necessary in execution of lower-level simulation, for example, the past operation histories of the transport robots RT or action patterns saved in advance using results of simulation already performed are used. Also, if there is a possibility of collision between transport robots RT, simulation may be executed for each transport robot RT with a possibility of collision.

In this way, the configuration of the first embodiment can also be applied to a case of predicting an indicator of work in a logistics operation system that performs work related to logistics operations (such as inspection, assortment, and packaging) using autonomous control robots and that includes an autonomous action system and a coordination management system. Thus, prediction of an indicator of work in a logistics operation system can be performed efficiently with high accuracy.

Although embodiments of the present invention have been described above in details, it goes without saying that the present invention is not limited to the above embodiments and can be modified variously without departing from the gist thereof. For example, the above embodiments have been described in details to give an easy-to-understand description of the present embodiment, and the present invention does not necessarily have to include all the configurations described. Also, addition of another configuration, deletion, or replacement can be made with respect to part of the configurations of the embodiments described above.

Also, some or all of the configurations, functional parts, processing parts, processing means, and the like described above may be implemented by hardware by, for example, integrated circuit designing or the like. Also, the configurations, functions, and the like described above may be implemented by software by a processor interpreting and executing programs for implementing the functions. The programs for implementing the functions and information such as tables and files may be placed in a storage device such as memory, a hard disk, or an SSD (Solid-State Drive) or a recording medium such as an IC card, an SD card, or a DVD.

Also, control lines and information lines that are shown in the drawings are only ones that are deemed necessary for the sake of illustration, and not all the control lines and information lines for actual implementation are necessarily shown. For example, in actuality, it can be considered that almost all the configurations are mutually coupled.

Also, the arrangements of the functional parts, the processing parts, and the databases in each information processing device described above are merely an example. The arrangements of the functional parts, the processing parts, and the databases may be changed into arrangements optimal from the perspective of the performance, processing efficiency, communication efficiency, or the like of the hardware or software in the apparatus having them.

Also, the configurations of databases for storing various pieces of data described above (such as Schema) may be changed flexibly from the perspectives of efficient use of resources, improvement in processing efficiency, improvement in access efficiency, improvement in search efficiency, and the like.

REFERENCE SIGNS LIST

- 31 higher-level process
- 32 lower-level process
- 35 buffer
- 100 prediction apparatus
- 110 storage part
- 111 higher-level model information
- 112 lower-level model information
- 113 work information
- 114 equipment information
- 115 worker information
- 116 parameter generation information
- 117 parameter
- 118 sample data
- 119 complementary data
- 120 process work stack table
- 121 virtual process progress table
- 130 work prediction part
- 132 equipment information management part
- 133 worker information management part
- 134 parameter generation information management part
- 135 parameter generation part
- 140 sample data management part
- 150 prediction processing part
- 151 sample data extraction part
- 152 complementation requirement determination part
- 153 complementary data generation part
- 154 predicted value calculation part
- 160 progress management part
- 161 work progress prediction part
- 162 work progress management part
- 163 process progress management part

The invention claimed is:

1. An information processing device configured to predict an indicator related to work performed through a plurality of hierarchical processes, wherein
regarding the work, the information processing device is configured to store sample data in association with each parameter representing the work, the sample data being data including an indicator generated by execution of lower-level simulation which is simulation based on a lower-level model which is a model set for a lower-level process which is the process at a lower level, and
regarding predicted work, which is work predicted, the information processing device is configured to predict an indicator related to the predicted work by performing higher-level simulation using the sample data associated with a parameter similar to a parameter representing the predicted work, the higher-level simulation being simulation based on a higher-level model which is a model set for a higher-level process which is the process at a higher level.

2. The information processing device according to claim 1, wherein
when executing the higher-level simulation, the information processing device determines whether the sample data associated with a parameter similar to the parameter representing the predicted work is stored,
if the sample data associated with a parameter similar to the parameter representing the predicted work is stored, the information processing device finds a predicted value of the indicator by performing the higher-level simulation using the sample data, and
if the sample data associated with a parameter similar to the parameter representing the predicted work is not stored, the information processing device finds a predicted value of the indicator related to the predicted work by performing the lower-level simulation of the lower-level process forming the higher-level process to generate the sample data for a parameter similar to the parameter representing the predicted work and then performing the higher-level simulation using the generated sample data.

3. The information processing device according to claim 2, wherein
the information processing device performs the determination based on a magnitude of an amount of change of the predicted value of the indicator related to the predicted work obtained by the higher-level simulation, relative to an amount of change of the parameter in the sample data.

4. The information processing device according claim 1, wherein
the information processing device performs the lower-level simulation using at least one of a simulator that simulates operation of a robot that performs work of the lower-level process and a simulator that simulates operation of a worker that performs work of the lower-level process.

5. The information processing device according to claim 1, wherein
the information processing device is communicatively coupled to a simulator that performs processing corresponding to the lower-level simulation using information received via a user interface as an input, and
the information processing device executes an RPA (Robotic Process Automation) script that automatically performs a series of processing including execution of simulation using the simulator by inputting a parameter to be inputted into the lower-level model into the simulator and acquisition of results of the simulation.

6. The information processing device according to claim 1, wherein
the work includes work performed using a plurality of robots capable of autonomous control,
the higher-level simulation is simulation for overall coordinated operation of the plurality of robots, and
the lower-level simulation is simulation for autonomous operation of each individual one of the plurality of robots.

7. An information processing method for predicting an indicator related to work performed through a plurality of hierarchical processes, the information processing method implemented by an information processing device comprising executing
regarding the work, storing sample data in association with each parameter representing the work, the sample data being data including an indicator generated by execution of lower-level simulation which is simulation based on a lower-level model which is a model set for a lower-level process which is the process at a lower level, and
regarding predicted work, which is work predicted, predicting an indicator related to the predicted work by performing higher-level simulation using the sample data associated with a parameter similar to a parameter representing the predicted work, the higher-level simulation being simulation based on a higher-level model which is a model set for a higher-level process which is the process at a higher level.

8. The information processing method according to claim 7, the information processing method implemented by the information processing device further comprising executing when executing the higher-level simulation, determining whether the sample data associated with a parameter similar to the parameter representing the predicted work is stored, if the sample data associated with a parameter similar to the parameter representing the predicted work is stored, finding a predicted value of the indicator by performing the higher-level simulation using the sample data, and if the sample data associated with a parameter similar to the parameter representing the predicted work is not stored, finding a predicted value of the indicator related to the predicted work by performing the lower-level simulation of the lower-level process forming the higher-level process to generate the sample data for a parameter similar to the parameter representing the predicted work and then performing the higher-level simulation using the generated sample data.

9. The information processing method according to claim 8, the information processing method implemented by the information processing device further comprising executing performing the determination based on a magnitude of an amount of change of the predicted value of the indicator related to the predicted work obtained by the higher-level simulation, relative to an amount of change of the parameter in the sample data.

10. The information processing method according to claim 7, wherein the information processing device is configured to perform the lower-level simulation using at least one of a simulator that simulates operation of a robot that performs work of the lower-level process and a simulator that simulates operation of a worker that performs work of the lower-level process.

11. The information processing method according to claim 7, wherein the information processing device is configured to be communicatively coupled to a simulator that performs processing corresponding to the lower-level simulation using information received via a user interface as an input, and the information processing method implemented by the information processing device further executes executing an RPA (Robotic Process Automation) script that automatically performs a series of processing including execution of simulation using the simulator by inputting a parameter to be inputted into the lower-level model into the simulator and acquisition of results of the simulation.

12. The information processing method according to claim 7, wherein the work includes work performed using a plurality of robots capable of autonomous control, the higher-level simulation is simulation for overall coordinated operation of the plurality of robots, and the lower-level simulation is simulation for autonomous operation of each individual one of the plurality of robots.

* * * * *